US006881048B1

(12) United States Patent
Tokita

(10) Patent No.: US 6,881,048 B1
(45) Date of Patent: Apr. 19, 2005

(54) APPARATUS FOR AUTOMATICALLY LOADING POWDER MATERIAL INTO A MOLD

(75) Inventor: Masao Tokita, Tokyo (JP)

(73) Assignee: Sumitomo Coal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/538,475

(22) Filed: Mar. 30, 2000

(30) Foreign Application Priority Data

Mar. 31, 1999 (JP) .......................................... 11-093335
Mar. 9, 2000 (JP) ...................................... 2000-065363

(51) Int. Cl.[7] ................................................ B29C 43/02
(52) U.S. Cl. ......................... 425/78; 425/258; 425/347; 425/353; 425/218
(58) Field of Search .......................... 425/78, 353, 415, 425/149, 257, 258, 256, 218, 347, 465, 413; 524/347, 408

(56) References Cited

U.S. PATENT DOCUMENTS

| | | | | |
|---|---|---|---|---|
| 861,903 A | * | 7/1907 | Rosell | 425/257 |
| 3,654,970 A | * | 4/1972 | Teboul | 264/0.5 |
| 3,887,317 A | * | 6/1975 | Plocher et al. | 425/257 |
| 4,373,888 A | * | 2/1983 | Yamamoto | 425/149 |
| 4,417,864 A | | 11/1983 | Shigeo et al. | |
| 5,362,434 A | * | 11/1994 | Hauser et al. | 425/258 |
| 5,433,903 A | * | 7/1995 | Hauser et al. | 425/149 |
| 5,476,631 A | | 12/1995 | Brown et al. | |
| 5,603,880 A | * | 2/1997 | Kato et al. | 246/112 |
| 5,635,223 A | * | 6/1997 | Korsch et al. | 425/345 |
| 5,747,073 A | * | 5/1998 | Pettersson et al. | 425/78 |
| 6,227,836 B1 | * | 5/2001 | Kato et al. | 425/89 |

FOREIGN PATENT DOCUMENTS

| | | |
|---|---|---|
| DE | 1076013 A | 2/1960 |
| DE | 2156796 | 5/1973 |
| IT | 1191800 | 3/1988 |
| JP | 49-37807 | 4/1974 |
| JP | 02-137696 A | 5/1990 |
| JP | 03-114699 A | 5/1991 |
| JP | 11-10397 A | 1/1999 |
| NL | 1002858 C | 10/1997 |

OTHER PUBLICATIONS

Patent Abstracts of Japan, vol. 004, No. 072 (M–13), May 27, 1980.
Patent Abstracts of Japan, vol. 011, No. 258 (M–618), Aug. 21, 1987.

* cited by examiner

*Primary Examiner*—Robert Davis
*Assistant Examiner*—Thu Khanh T. Nguyen
(74) *Attorney, Agent, or Firm*—Sughrue Mion, PLLC

(57) ABSTRACT

The present invention is a method of loading a desired amount of powder material into a mold which comprises a tubular body having a bore extending therethrough to define a mold cavity. The method comprises the steps of: providing the mold with a lower press core fitted in the lower end of the bore; bringing the mold with said lower press core fitted therein to a powder filling position; displacing the lower press core relative to the mold so as to determine the depth of the top surface of the lower press core from the top surface of the mold; filling an amount of powder material into the mold and strickling off any excessive amount of powder material to the level of the top surface of the mold; pressing at a desired pressure the amount of powder material in the mold to form a powder compact; and displacing the powder compact with the lower press core relative to the mold so as to bring the powder compact to a desired position in the mold.

19 Claims, 20 Drawing Sheets

APPARATUS FOR AUTOMATICALLY LOADING POWDER MATERIAL INTO A MOLD

BACKGROUND OF THE DISCLOSURE

The present invention generally relates to method and apparatus for automatically loading powder material into a mold and, more particularly, to such method and apparatus for automatically loading a desired amount of powder material into a mold which comprises a tubular body having a bore extending therethrough. The mold may be either a sintering mold used for sintering the powder material loaded therein during sintering process or a powder-compact-forming mold used only for forming a powder compact therein while the powder compact thus formed is subjected to sintering process after being removed from the mold.

There have been provided various powder material loading apparatus for loading an amount of powder material into a sintering mold to form a powder compact in the mold, which is retained in the mold during a subsequent sintering process, such as an electrical sintering process. However, there has not been proposed an idea of a continuous fabrication process for obtaining sintered products, including the steps of: loading an amount of powder material into a sintering mold in the form of a plurality of layers; heating the powder compact retained in the mold for sintering; and removing the sintered product from the mold. This idea has not been proposed primarily because conventional electrical sintering techniques require a relatively long time to complete the sintering process. In consequence thereof, any of conventional automatic powder material loading apparatus was not intended for such a continuous fabrication process but provides solely the function for loading powder material into a mold.

Recently, many improvements has been made in electrical sintering methods. For example, Pulsed Current Energizing Sintering (or Pulsed Electric Current Sintering) method using a pulsed current and including Spark-Plasma Sintering, Electric-Discharge Sintering and Plasma-Activated Sintering methods proposed by the applicant of this application has been improved. According to the improved Pulsed Current Energizing Sintering, sintering time is drastically shortened. Such shorter sintering time provides the possibility of realizing a continuous fabrication process for obtaining sintered products, including the above mentioned steps. Therefore, there have now arisen demands for such a method and apparatus for loading powder material into a mold that may be suitably used for such a continuous fabrication process.

In addition, by virtue of newer electrical sintering techniques, such as those mentioned above, such materials that were difficult to bond together through any older techniques can be now bonded together with ease into a unitary sintered product. Examples of such materials are: a stainless steel vs. copper; a ceramic vs. a metal; etc. Such a unitary sintered product of two different powder materials may be fabricated to have two-layered structure composed of two layers bonded together and each made of a pure powder material; however, the characteristics of such a sintered product can be improved by adding at least one middle layer to create such multi-layered structure in that the middle layer is made of a mixture of the two powder materials. Further, such multi-layered structure may be also used with advantageous for a sintered product including three or more layers made of respective powder materials which are identical in composition and differ from one another only in particle size, wherein the powder materials for the layers have their particle sizes gradually increasing from the layer on one side of the product toward the other side. Such a sintered product may have gradient functionality (i.e., the gradual variation in properties of the sintered product from one side of the product to the other) so as to achieve more improved characteristics. In order to fabricate a sintered product having gradient functionality, it is required to load different powder materials, which differ from one another in at least one of properties including component(s) of powder material, percentages of components, particle size and particle shape, into a mold so as to form corresponding powder layers of desired thickness with precision. While there have been proposed various automatic powder material loading apparatus, none of them is capable of loading different powder materials into a mold to form a multi-layered powder compact in a fully automated manner. In addition, in order to fabricate high-quality sintered products having gradient functionality with good reproducibility, not only the capability of forming a multi-layered powder compact but also other various capabilities are required, so it is the case that none of conventional powder material loading apparatus is suitable for fabrication of sintered products having gradient functionality.

SUMMARY OF THE INVENTION

In view of the foregoing, it is an object of the present invention to provide a method and apparatus for automatically loading powder material into a mold, in which different powder materials may be loaded into a mold, which may be either a sintering mold or a powder-compact-forming mold, so as to form a plurality of powder layers one on another in the mold in a fully automated manner.

It is another object of the present invention to provide a method and apparatus for automatically loading powder material into a mold, in which the powder material loading sequence may be carried out in a fully automated manner, by utilizing the step of filling an amount of powder material into a mold followed by the step of strickling off any excessive amount of powder material to the level of the top surface of the mold.

It is a further object of the present invention to provide a method and apparatus for automatically loading powder material into a mold, in which different powder materials, differing from one another in at least one of properties including component(s) of powder material, percentages of components, particle size and particle shape, may be loaded into a mold so as to form a plurality of powder layers one on another in the mold in a fully automated manner, by utilizing the step of filling an amount of powder material into a mold followed by the step of strickling off any excessive amount of powder material to the level of the top surface of the mold.

It is a still further object of the present invention to provide a method and apparatus for automatically loading powder material into a mold, in which high-quality sintered products may be fabricated by utilizing the step of pressing at a desired pressure the layer of powder material filled into the mold.

It is a yet further object of the present invention to provide a new powder filling mechanism, which is capable of filling an amount of powder material into a mold, such as a sintering mold or a powder-compact-forming mold, so as to form a powder layer in the mold with precision.

In accordance with an aspect of the present invention, there is provided a method of automatically loading a desired amount of powder material into a tubular mold having a bore extending therethrough, the method comprising the steps of: providing the mold with a lower press core fitted in a lower end of the bore; bringing the mold with the lower press core fitted therein to a powder filling position; filling an amount of powder material into the mold and strickling off any excessive amount of powder material to the level of a top surface of the mold; and pressing at a desired pressure the amount of powder material in the mold to form a powder compact.

In a preferred embodiment of the present invention, the mold may comprise a sintering mold and the lower press core may have a top surface. In such case, the method may further comprise the steps of: determining the depth of the top surface of the lower press core from the top surface of the sintering mold; displacing the powder compact with the lower press core relative to the sintering mold so as to bring the powder compact to a desired position in the sintering mold; and fitting an upper press core into the bore of the sintering mold above the powder compact. Alternatively, the mold may comprise a powder-compact-forming mold and the lower press core may have a top surface. In such case, the method may further comprise the step of: determining the depth of the top surface of the lower press core from the top surface of the powder-compact-forming mold; and displacing the powder compact with the lower press core relative to the powder-compact-forming mold so as to remove the powder compact and the lower press core from the powder-compact-forming mold.

In another preferred embodiment of the present invention, the method may further comprise the step of repeating the filling/strickling step a number of times so as to form in the mold a multi-layered powder compact comprising layers of different powder materials, which differ from one another in at least one of properties including component(s) of powder material, percentages of components, particle size and particle shape. Further, in such embodiment, the method may comprise the step of repeating the pressing step subsequent to every repetition of the filling/strickling step or, alternatively, may comprise the step of repeating the pressing step subsequent to every two or more repetitions of the filling/strickling step.

In a further preferred embodiment of the present invention, different powder materials may be stored in individual hoppers, wherein the powder filling position may be defined at a single position common to all of the hoppers, and wherein the method may further comprise the step of bringing the hoppers sequentially to the single powder filling position. Alternatively, different powder materials may be stored in individual hoppers, wherein the powder filling position is defined at a number of positions one for each of the hoppers, and wherein the method may further comprise the step of bringing the mold sequentially to the number of powder filling positions in the order appropriate for forming the plurality of layers in the mold. In addition, the weight of the amount of powder material filled into the mold may be measured after the filling/strickling step is performed.

In accordance with another aspect of the present invention, there is provided an apparatus for automatically loading a desired amount of powder material into a tubular mold having a bore extending therethrough, the apparatus comprising: a mold conveyor system for supporting and conveying the mold with a lower press core fitted in the bore; a powder filling mechanism for filling an amount of powder material into the mold, the powder filling mechanism being located at a powder filling position defined along a transportation path of the mold conveyed by the mold conveyor system; and a press unit for pressing at a desired pressure the amount of powder material in the mold to form a powder compact.

In a preferred embodiment of the present invention, the mold conveyor system may comprise: a guide rail extending to cover a predetermined range; and a carrier movable along the guide rail and capable of supporting for vertical displacement the mold with the lower press core fitted in the bore. The powder filling mechanism may comprise: a hopper located above a transportation path of the carrier and adapted to store an amount of powder material therein; and a strickle mechanism for strickling off any excessive amount of powder material, being filled into the mold from the hopper, to the level of a top surface of the mold. Further, the press unit may comprise: a lower plunger for pressing upward the lower press core fitted in the mold; and an upper plunger for pressing downward the amount of powder material in the mold.

In another preferred embodiment of the present invention, a plurality of the powder filling mechanisms may be provided, in which different powder materials are stored, respectively, differing from one another in at least one of properties including component(s) of powder material, percentages of components, particle size and particle shape, wherein the plurality of powder filling mechanisms may be arranged in line along the transportation path of the carrier. Further, the hopper may be movable relative to the mold as held at the powder filling position and movable on a plane of the top surface of the mold as held at the powder filling position, and the hopper may form a part of the strickle mechanism.

In a further preferred embodiment of the present invention, the carrier may comprise: a movable base; a receiving plate for supporting the mold, the receiving plate being supported by the movable base for vertical displacement relative to the movable base; a push-up member for displacing the lower press core fitted in the bore of the mold when the mold is supported by the receiving plate, the push-up member being supported by the receiving plate for vertical displacement relative to the receiving plate; and a drive unit for driving the push-up member to make displacement. Further, the apparatus may further comprise a measure unit for measuring the weight of the sintering mold with the amount of powder material filled into the mold, so as to measure the weight of the amount of powder material filled into the mold.

In a still further preferred embodiment of the present invention, the powder filling mechanism may have a single powder filling position. The powder filling mechanism may comprise: at least one hopper movable to and from the single powder filling position and adapted to store an amount of powder material therein; and a strickle mechanism for strickling off any excessive amount of powder material, being filled into the mold from the hopper, to the level of the top surface of the mold. Further, the press unit may comprise a lower press member located at the powder filling position, for pressing upward the lower press core fitted in the mold; and an upper press member for pressing downward the amount of powder material in the mold. Moreover, the mold conveyor system may comprise: a guide rail; a movable base guided by the guide rail for movement along the guide rail and having a number of holes formed therein and arranged in line, each of the holes being adapted to be aligned with the bore of the mold; a stop member attached to the movable base, for limiting upward displacement of the mold; and a drive unit for driving the movable base to move along the guide rail in both directions, whereby the movable base is capable of carrying the same number of the mold as that of the holes at one time.

In a yet further preferred embodiment of the present invention, the powder filling mechanism may further comprise a rotary table capable of indexing movement. The hopper may be movable relative to the mold held at the powder filling position and movable on a plane of the top surface of the mold held at the powder filling position, and thereby the hopper may form a part of the strickle mechanism. The at least one hopper may comprise a plurality of hoppers provided on the rotary table at circumferentially spaced positions with respect to the axis of the rotary table, the plurality of hoppers being capable of individual movement, wherein different powder materials may be stored in the plurality of hoppers, respectively, differing from one another in at least one of properties including component(s) of powder material, percentages of components, particle size and particle shape.

In accordance with a further aspect of the present invention, there is provided a powder filling mechanism for filling powder material into a mold which has a bore opening at a top end thereof, the mechanism comprising: a support plate having a top surface and a hole for receiving the upper end of the mold, wherein the upper end of the mold may be fitted in the hole without any substantial clearance therebetween and with a top surface of the support plate and the top surface of the mold being substantially flush with each other; and a hopper having a bottom surface and so disposed as to be movable on the top surface of the support plate with the bottom surface being in contact with the top surface of the support plate, the hopper having an amount of powder material stored therein. The hopper has a bottom opening for dispensing powder material, which opens at the bottom surface and has a size equal to or greater than that of a top opening of the bore of the mold, wherein the hopper is movable on the top surface of the support plate and across the top surface of the mold.

In a preferred embodiment of the present invention, the hopper may be movable between a first position at which the bottom opening of the hopper is closed by the support plate and a second position at which the bottom opening of the hopper is in alignment with the hole in the support plate, whereby powder filling is completed by a pair of strokes of the hopper from the first position to the second position and then back to the first position. Alternatively, the hopper may be movable along a straight path between first and third positions at which the bottom opening of the hopper is closed by the support plate, wherein the hopper passes by a second position during a stroke between the first and third positions, at which the bottom opening of the hopper is in alignment with the hole in the support plate, whereby powder filling is completed by a single stroke of the hopper from one of the first and third positions to the other.

BRIEF DESCRIPTION OF THE DRAWINGS

The above and other objects, features and advantages of the present invention will be apparent from the following detailed description of preferred embodiments thereof, reference being made to the accompanying drawings, in which.

DETAILED DESCRIPTION OF THE INVENTION

With reference now to the accompanying drawings, preferred embodiments of the present invention will be described in detail.

Figure 1A:
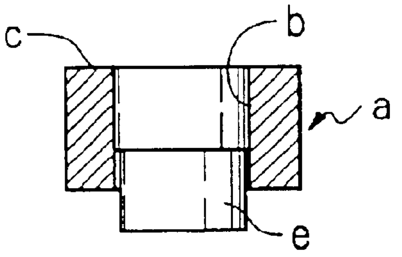
FIGS. 1A to 1H are section views of a sintering mold, illustrating principles of a method of automatically loading powder material into a mold, in accordance with the present invention.

Referring first to FIGS. 1A to 1H, we will describe the principles of a method of automatically loading powder material into a mold, in accordance with the present invention. (1) First, a mold a used in the method is provided, which comprises a tubular body having a bore b extending therethrough to define a mold cavity, as shown in FIG. 1A. A lower press core e is also provided, which is inserted into the bore b from the bottom of the mold a and thereby fitted in the bore b. The mold a may be either a sintering mold used not only for forming a powder compact therein but also for retaining the powder compact therein during subsequent electrical sintering process or a powder-compact-forming mold used only for forming a powder compact therein while the powder compact thus formed is subjected to sintering process after removed from the mold. In the former case, the mold a and the lower press core e may be formed of any suitable conductive material for electrical sintering process, such as graphite. In the latter case, the mold a and the lower press core e may be formed of any suitable iron-based material, such as a steel. The mold a with the lower press core e fitted therein is placed on a tray (not shown) and brought to a powder filling position, and the mold a is aligned to the powder filling position with precision. It is noted that the tray is used in order to facilitate the continuous fabrication process and not to prevent the lower press core from dropping off the mold; in fact, the lower press core is fitted tight in the bore of the mold, which could effectively prevent the lower press core from dropping off the mold even if no tray were used but the mold itself were gripped for transportation.

Figure 1B:
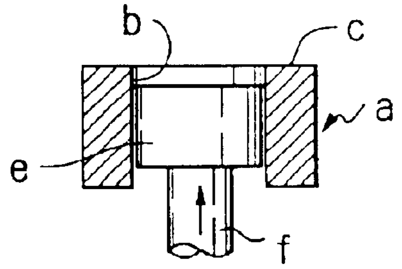

(2) Subsequently, the mold a is fixedly held at the powder filling position while the lower press core e is pushed up by a push-up rod f, as shown in FIG. 1B, so that the lower press core e is displaced in vertical direction relative to the mold a (which is fixedly held at this point of time), until the distance (or depth) of the top surface of the lower press core e from the top surface c of the mold a becomes a desired distance (or desired depth). The desired depth depends on a desired amount of powder material to be filled into the mold a and thus on a desired thickness of the powder layer to be formed in the mold a.

Figure 1C:
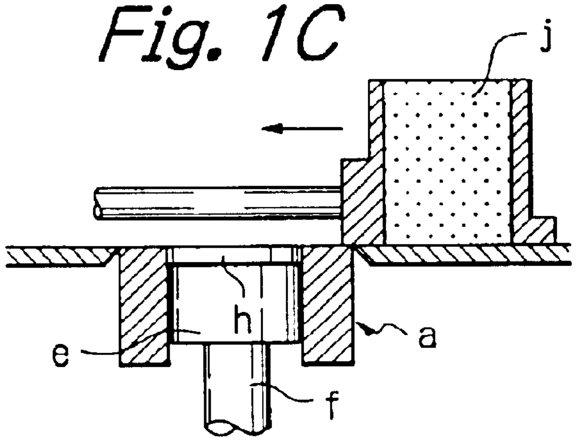

(3) Thereafter, as shown in FIG. 1C, the desired amount of powder material j is filled into the space h defined by the mold a and the top surface of the lower press core e by means of a powder filling mechanism, which also serves as a strickle for strickling off any excessive amount of powder material to the level of the top surface of the mold, as described later in greater detail. When the powder filing operation has been done, the amount of powder material j filled into the space h forms a layer having its top surface level with (or flush with) the top surface c of the mold a.

Figure 1D:
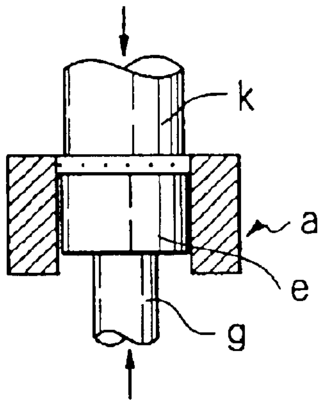
Figure 1E:
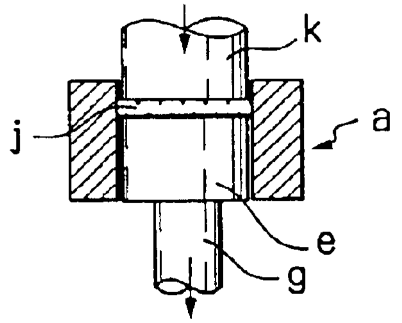
Figure 1F:
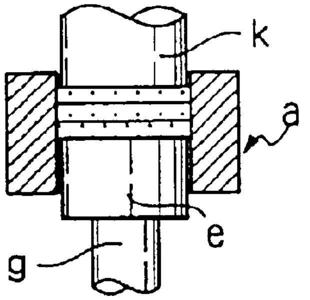

(4) Then, as shown in FIG. 1D, the amount of powder material j in the mold a is pressed at a desired pressure by lowering an upper plunger k while the lower press core e is held stationary by a lower plunger g supporting the bottom of the lower press core e so as to form a powder compact. The desired pressure depends on the properties of the powder material to be filled, such as component material(s) and/or particle size of the powder material, and is selected to a pressure which ensures that satisfactory final products may be obtained after sintering.

(5) The apparatus may be used to form in the mold a multi-layered powder compact comprising layers of different powder materials, differing from one another in at least one of properties including component(s) of powder material, percentages of components, particle size and particle shape. In the case where such a multi-layered powder compact is to be formed, following the pressing operation of powder material in the mold to form a powder compact, as carried out in step (4) above, the upper and lower plungers k and g are displaced together in vertical direction relative to the mold a so as to adjust the depth of the top surface of the powder compact (formed of the previously filled powder material) from the top surface c of the mold to a desired depth which depends on a desired amount of powder material to be filled into the mold for the next powder layer. Then, the operations in steps (3) and (4) above are repeated for the next powder layer. The sequence of operations in step (5) is reiterated thereafter for each of the powder layers to be included in the multi-layered powder compact.

Figure 1G:
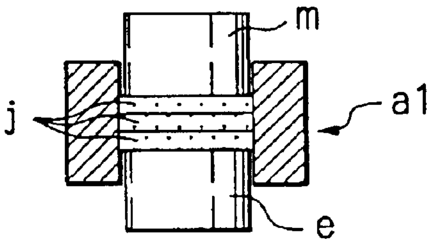
Figure 1H:
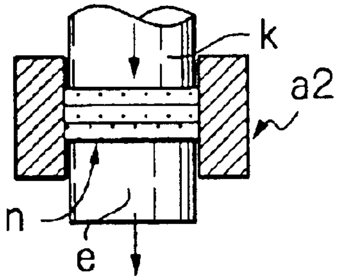

(6) If the mold is a sintering mold a1, the finished powder compact is to be subsequently subjected to the sintering process while retained in the mold. In such a case, simultaneously to or after the pressing operation of the last powder layer in the multi-layered powder compact, the lower plunger g, the lower press core e, the finished powder compact and the upper plunger k are displaced together downward relative to the mold a so as to adjust the vertical position of the finished powder compact within the mold to a desired vertical position (which is typically the vertically middle position within the mold). Then, the upper plunger k is removed from the mold and replaced by an upper press core m made of a tough, conductive material, such as graphite carbide, which is inserted from above into the bore b of the sintering mold, as shown in FIG. 1G. At this point of time, the sequence of operations for loading powder material into the sintering mold is completed, and the sintering mold, which has the upper and lower press cores fitted therein and retains the finished powder compact therein, is sent to the following station for sintering process. On the other hand, if the mold is a powder-compact-forming mold a2, the finished powder compact n is removed from the mold a2 by suitable operations, such as displacing the upper plunger k downward so as to push down the powder compact n out of the mold. It is noted that the pressing operation of the powder material in the mold may be repeated subsequent to every repetition of the filling/strickling operation or, alternatively, may be repeated subsequent to every two or more repetitions of the filling/strickling operation. Also, the powder layer thickness will be reduced by compaction caused by the pressing operation; such reduction in powder layer thickness has to be taken into consideration when the powder filling operation for the next layer is carried out.

Figure 2:
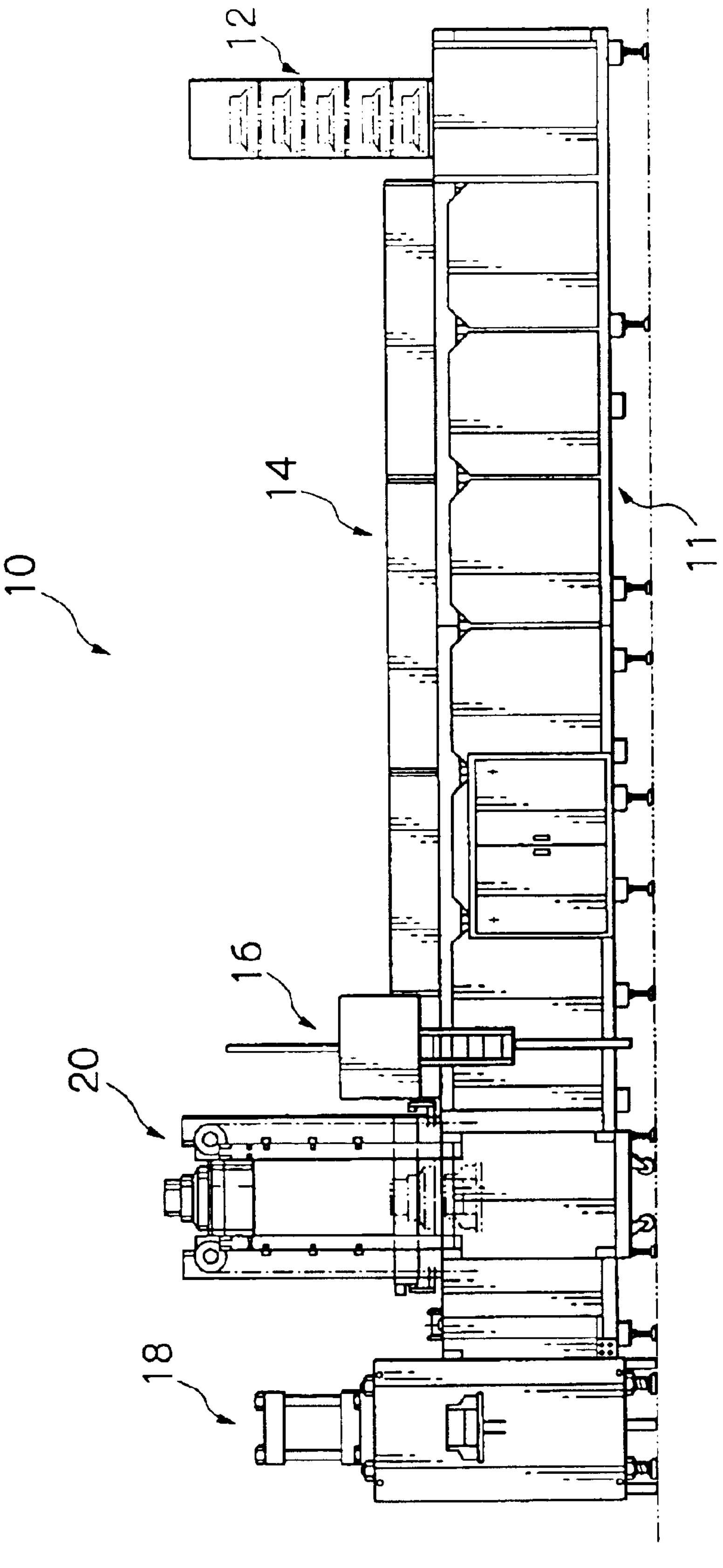
FIG. 2 is a side elevation view of an apparatus for automatically loading powder material into a mold, constructed and arranged in accordance with a first embodiment of the present invention.
Figure 3:
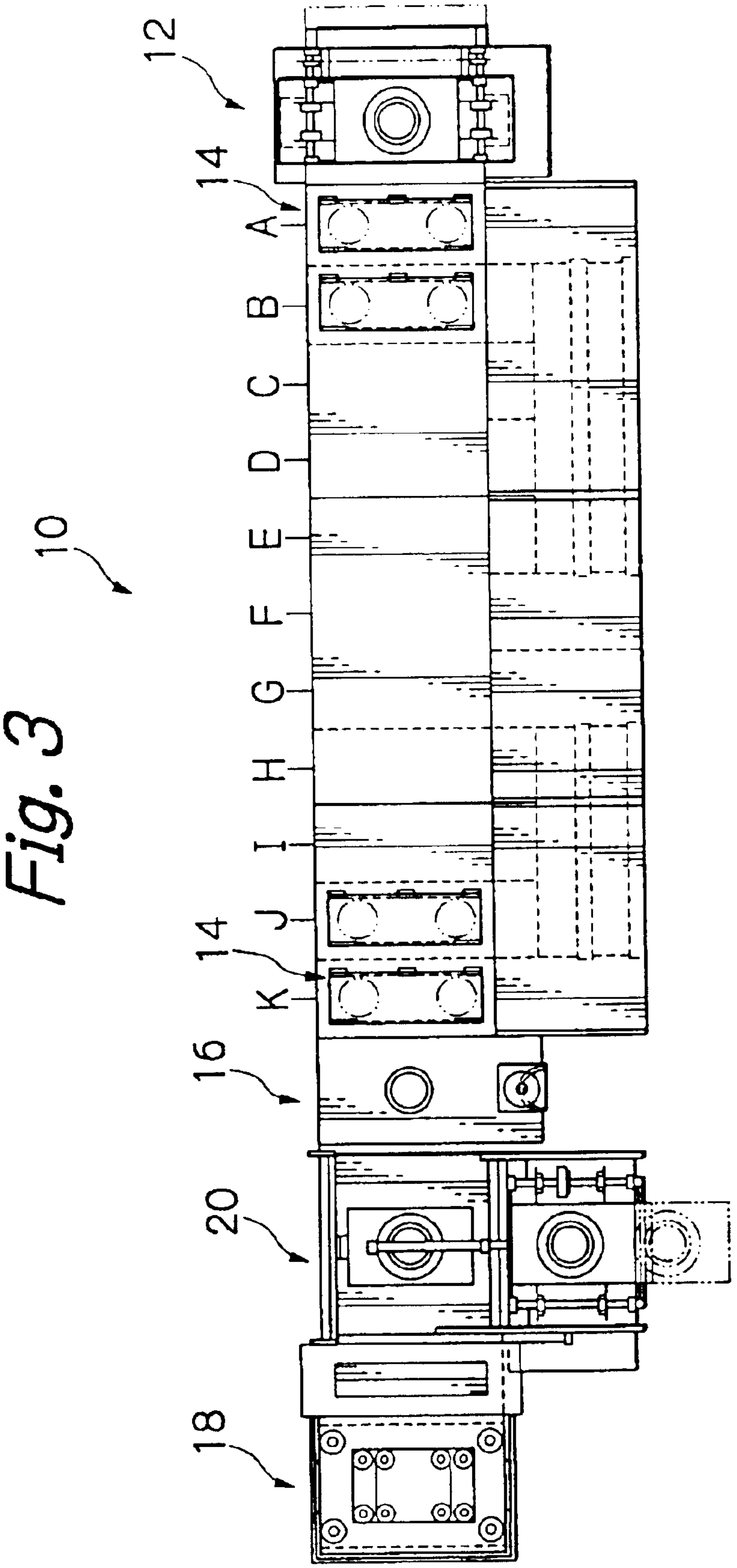
FIG. 3 is a plan view of the automatic powder material loading apparatus of FIG. 2.

Referring next to FIGS. 2 to 15, we will describe an apparatus for automatically loading powder material into a mold, constructed and arranged in accordance with a first embodiment of the present invention, together with an exemplified sequence of operations carried out by the apparatus for loading powder material into a sintering mold, in which electric sintering is effected to the powder compact retained therein. FIGS. 2 and 3 show the whole of the automatic powder material loading apparatus 10 (referred to more simply as the "loading apparatus" hereinafter) of the first embodiment. The loading apparatus 10 may be suitably used to form in a sintering mold a multi-layered powder compact comprising layers of different powder materials, which differ from one another in at least one of properties including component(s) of powder material, percentages of components, particle size and particle shape. The loading apparatus 10 includes a plurality of powder filling mechanisms arranged in line and used independently for filling different powder materials, respectively, as detailed below. More specifically, the loading apparatus 10 comprises a frame 11 (shown extending in horizontal direction in FIGS.

Figure 4:
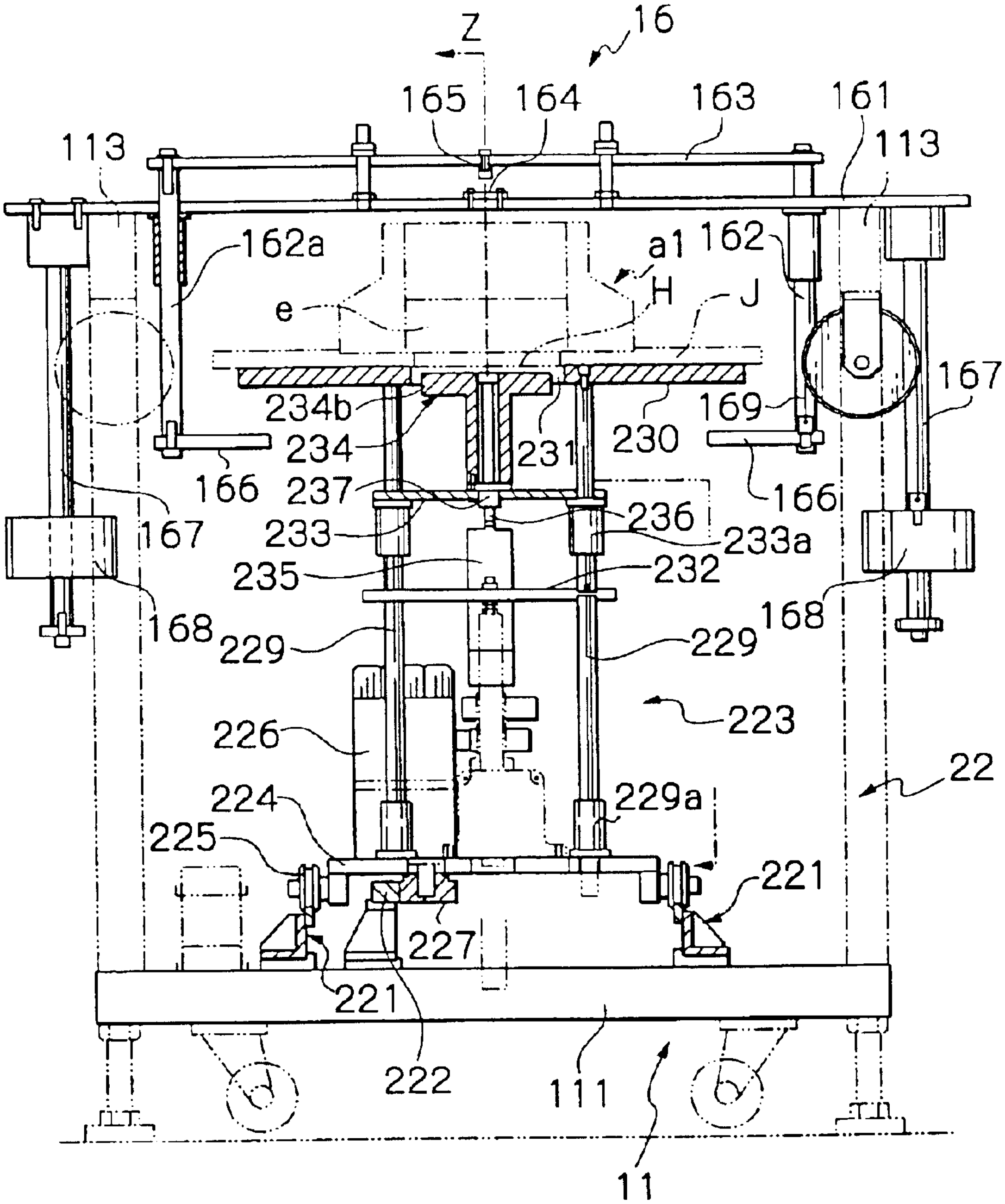
FIG. 4 is a front elevation view of a carrier and a measure unit of the automatic powder material loading apparatus of FIG. 2, showing the carrier partially cut away.

2 and 3), a sintering mold dispenser unit 12 provided at one end (the right-hand end in FIGS. 2 and 3) of the frame 11, a powder filling system including a plurality of powder filling mechanisms 14 arranged in line along the length of the frame 11, a measure unit 16 provided on the frame 11 and located next to the powder filling system, a press unit 18 constructed separately from the frame 11 and located next to the left-hand end of the frame 11, a take-out unit 20 for taking our or picking up and sending a sintering mold, and a sintering mold conveyor system 22 (not shown in FIG. 2 nor FIG. 3) for conveying a sintering-mold-and-tray (i.e., a sintering mold together with a tray on which it is placed) from the sintering mold dispenser unit 12 to the press unit 18. Thus, in this embodiment, a sintering mold a1 is conveyed together with an associated tray J on which the sintering mold a1 is placed. As shown in FIG. 4 by imaginary lines, the tray J has a central, circular opening H formed therein, which has a smaller diameter than the bore b of the sintering mold. The tray J also has a central, shallow recess formed on its top surface, for receiving the bottom portion of the sintering mold so as to ensure appropriate placement of the sintering mold on the tray J during transportation. The sintering mold, when stored in the dispenser unit 12, has a lower press core e fitted in the bore b, with the outer peripheral edge of the bottom of the lower press core e being in engagement of the top surface of the tray J along the edge of the central opening H of the tray J. Under this condition, the sintering mold is dispensed by the dispenser unit 12 onto a carrier which is described in detail below.

With reference to FIGS. 4 and 5, the sintering mold conveyor system 22 includes a pair of spaced, horizontal guide rails 221 extending in the longitudinal direction of the elongated frame 11 to cover the entire length of the frame 11. The guide rails 221 are mounted on under frame members 111 of the frame 11 as well as on a base plate of the press unit 18. The conveyor system 22 further includes a rack 222 extending along the guide rails 221 and a carrier 223 supported by and movable along the guide rails 221. The carrier 223 includes a horizontal, flat, movable base plate 224 having four wheels 225 (two are provided on each of right- and left-hand sides (as viewed in FIG. 4) of the movable base plate 224, with only two of them being shown in FIG. 4). With these wheels 225 provided, the movable base plate 224 is capable of running along the guide rails 221. The movable base plate 224 is driven to run along the guide rails 221 by means of a drive motor 226 mounted on the movable base plate 224 and having reduction gears incorporated therein. The drive motor 226 has an output shaft with a pinion 227 fixedly mounted thereon and in engagement with the rack 222, so that operation of the drive motor 226 causes the movable base plate 224 to run along the guide rails 221. The movable base plate 224 has four bearing sleeves 229*a* fixedly mounted thereon (two are provided on each side of the base plate 224, with only two being shown in FIG. 4) and four vertical posts 229 supported and guided by the respective bearing sleeves 229*a* for vertical displacement relative to the movable base plate 224. A horizontal, flat, receiving plate 230 is secured to and supported by the upper ends of the four vertical posts 224. The receiving plate 230 has a central, circular opening 231 formed therein. When a tray J carrying a sintering mold a1 is placed on the receiving plate 230, the opening 231 is substantially in alignment with the hole b of the sintering mold a1. A mount plate 232 is secured to and interconnects the four vertical posts 229 near the middle points of the posts 229.

Figure 5A:
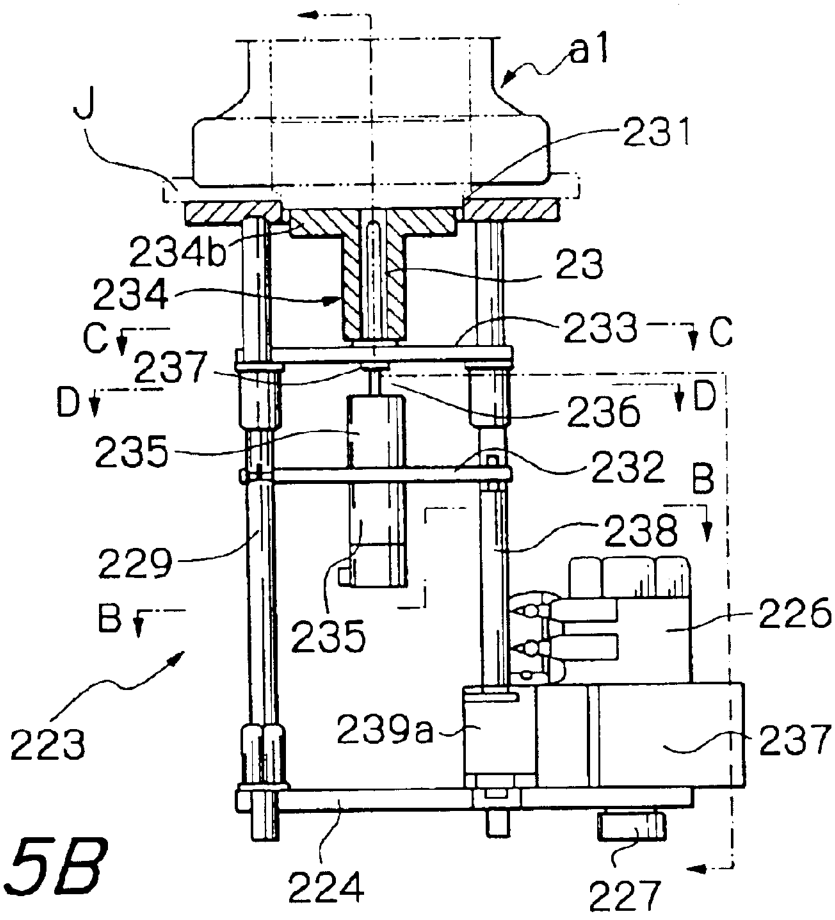
FIG. 5A is a side elevation view, partially sectioned, of the carrier as viewed in the direction of arrows Z—Z in FIG. 4.

A lift plate 233 is provided between the mount plate 232 and the receiving plate 230. The lift plate 233 has four bearing sleeves 233*a* fixedly mounted thereon, for receiving the respective vertical posts 229, such that the lift plate 233 is guided by the vertical posts 229 for vertical displacement. The lift plate 233 further has a push-up member 234 fixedly mounted on the top surface thereof, for pushing up the lower press core e fitted in the sintering mold a1 carried by the tray J on the receiving plate 230. The mount plate 232 has a drive motor 235 mounted thereon, which comprises an electric motor having reduction gears incorporated therein. The drive motor 235 has a vertical output shaft, the axis of which is in alignment with the axis of the opening 231 of the receiving plate 230. The output shaft of the drive motor 235 has a screw spindle 236 fixedly connected thereto, so that the operation of the drive motor 235 causes the screw spindle 236 to rotate. The lift plate 233 has a nut 237 fixedly mounted thereon and in thread engagement with the screw spindle 236. When the drive motor 235 is operated to rotate the screw spindle 236, the lift plate 233 is displaced together with the push-up member 234 in vertical direction relative to the vertical posts 229 and thus to the mount plate 232. The push-up member 234 has a cylindrical stem with its axis extending in vertical direction and a horizontal top flange 234*b* extending radially outwardly from the top end of the stem, with an axial bore 234*a* being formed therethrough to extend in vertical direction (FIG. 5A). The screw spindle 236 is received in the axial bore 234*a* of the push-up member 234. In the embodiment, the electric motor used in the drive motor 235 comprises a stepper motor capable of positioning control with accuracy allowing positioning errors which are well less than 0.1 mm and typically on the order of 0.01 mm. Other devices may be also used as long as they may provide compatible positioning accuracy.

The movable base plate 224 has a lift motor (an electric motor) 239 mounted thereon. A vertical rod 238 is fixedly connected to the mount plate 232, with the upper end of the rod 238 being secured to the mount plate 232. The movable base plate 224 further has a drive mechanism mounted thereon, for operatively interconnecting the output shaft of the lift motor 239 and the vertical rod 238 so as to translate rotary motion of the former into linear motion of the latter. The drive mechanism may comprise a rack-and-pinion mechanism, a feed screw mechanism or a roller mechanism comprising a roller in frictional contact with the vertical rod 238. Preferably, the drive mechanism may comprise a rotary nut (not shown) supported for rotation and driven by the lift motor 239, with the vertical rod 238 comprising a screw rod in thread engagement with the rotary nut. Such mechanism may typically allows the control of the vertical displacement of the mount plate 232 with accuracy allowing positioning errors less than 0.1 mm. In operation, when the lift motor 239 is operated to rotate the rotary nut, the mount plate 232 is displaced together with the posts 229 and the receiving plate 230 in a vertical direction relative to the movable base plate 224. The carrier 223 conveys a sintering mold a1, when the sintering mold a1 is placed on a tray, which is in turn placed on the receiving plate 230. The tray J is a plate-like member having a central, shallow recess formed in its top surface, for receiving the bottom of a sintering mold a1. The sintering mold a1 may be placed in position on the tray J as well as held by the tray J by virtue of the central recess. While the positioning and holding of a sintering mold on a tray is provided by the central recess of the tray in this embodiment, other known means may be also used to provide these functions. Further, while the sintering mold used in this embodiment comprises a hollow cylindrical body with a circular cross section, any other sintering molds comprising a tubular body with different cross sections may be also used. The movable base plate 224, the mount plate 232 and the lift plate 233 have recesses or cutouts 224', 232' and 233', respectively, which are open toward one direction, facing to one end of the guide rails 221, which direction is referred to as the forward direction of the carrier 233. The recesses 224', 232' and 233' are capable of receiving an upright, hollow cylindrical pedestal of the press unit 18 (providing the same function as the lower plunger g of FIGS. 1B to 1F, as described in greater detail below), such that the axis of the push-up member 234 may be substantially in alignment with the axis of the cylindrical pedestal. If the lower press core e is sized such that it may be fitted so tight in the sintering mold a1, the lower press core e will not be lowered within the mold during the subsequent powder filling operation without any support to the lower. press core e. If this is the case, the drive motor 235 for lifting up/down the push-up member 234 relative to the mount plate 232 may be replaced by a hydraulic cylinder, as long as the latter is capable of defining the upper limit position of the lower press core e with precision.

Figure 7:
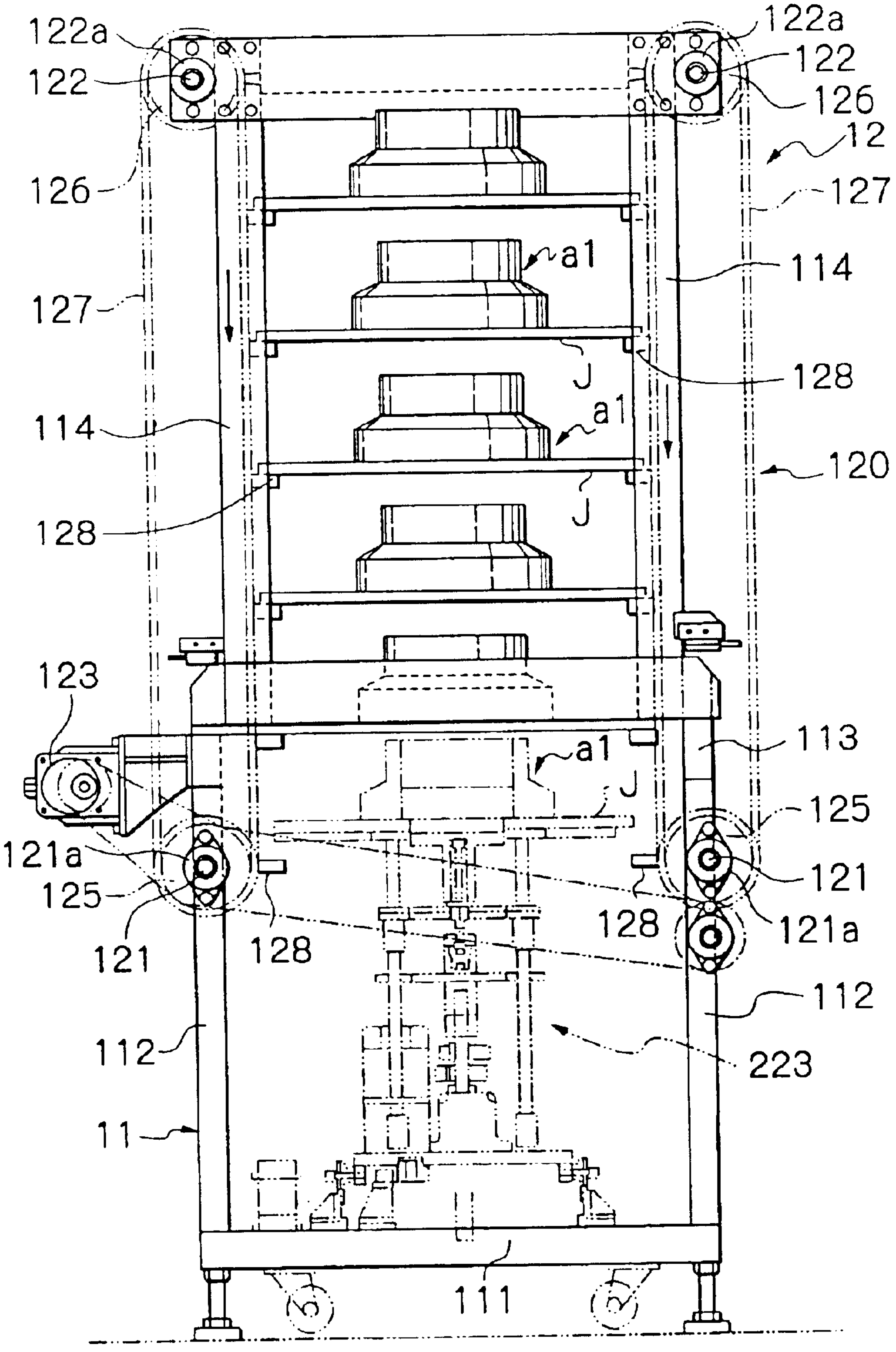
FIG. 7 is a front elevation view of a sintering mold dispenser unit.
Figure 8:
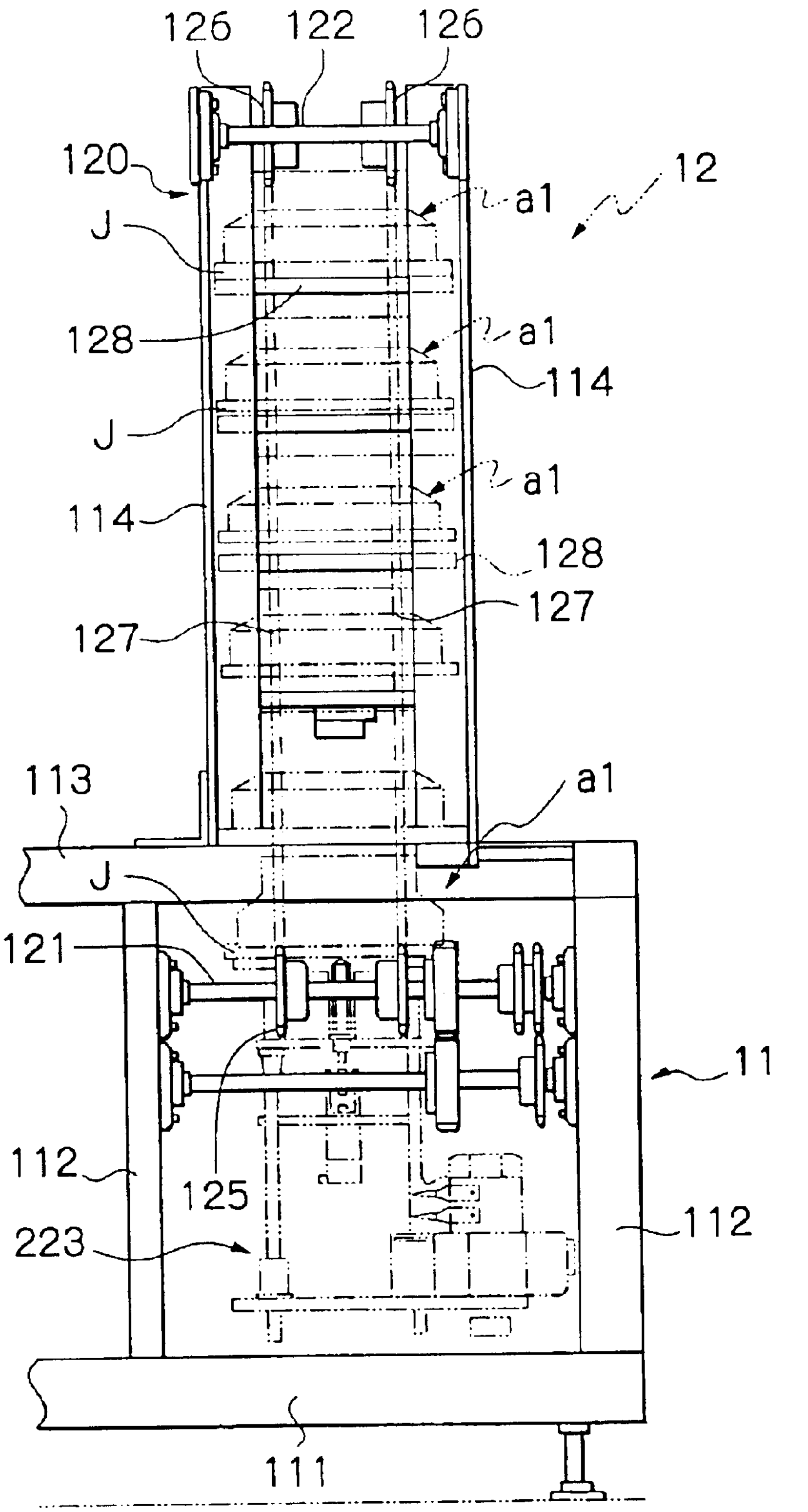
FIG. 8 is a side elevation view of the sintering mold dispenser unit of FIG. 7 as viewed in the direction square to that in FIG. 7.

With reference to FIGS. 7 and 8, the sintering mold dispenser unit 12 comprises an elevator 120 for storing therein a plurality of sintering molds a1 together with associated trays J each carrying one of the molds a1, and for sequentially lifting down and dispense the sintering molds a1 with trays J. The elevator 120 comprises: a pair of horizontal drive shafts 121 provided on opposite sides of the frame 11 (right- and left-hand sides of the frame 11, as viewed in FIG. 7); a pair of horizontal idler shafts 122 associated with the drive shafts 121; and a drive motor (an electric motor) 123 for driving the drive shafts 121 to rotate. The drive shafts 121 are supported for rotation by means of respective bearings 121*a* of a known type and mounted thereby on the upper edges of a pair of right and left side members 112 of the frame 11 (FIG. 7). The frame 11 further comprises two pairs of vertical columns 114 for the sintering mold dispenser unit 12, which are mounted on the pair of side members 112. The idler shafts 122 are supported for rotation by means of bearings of a known type and mounted thereby at the top ends of the vertical columns 114, such that the idler shafts 122 are provided on opposite sides of the frame 11 and just above the associated drive shafts 121. The sintering mold dispenser 12 further comprises a drive train of a known chain-and-sprocket type for transmitting the torque of the drive motor 123 and driving the drive shafts 121 to rotate in opposite directions (i.e., the right- and left-hand drive shafts are driven to rotate in clockwise and counterclockwise directions, respectively, as viewed in FIG. 7). More specifically, the drive train comprises, for each side of the frame 11, a pair of spaced sprockets 125 fixedly mounted on the drive shaft 121 on that side of the frame 11 and a pair of spaced sprockets 126 fixedly mounted on the idler shaft 122 on that side, the sprockets 126 being spaced apart the same distance as the sprockets 125. For each side of the frame 11, the pair of sprockets 125 on the drive shaft 121 and the pair of sprockets 126 on the idler shaft 122 are operatively connected through a pair of endless chains 127 wound round them. In this manner, two pairs of chains 127 are provided in total, one pair being provided on each side of the frame 11. Each pair of chains 127 have a plurality of horizontal, support bars 128 mounted thereon at constant intervals and interconnecting the chains 127 of the pair. The pair of drive shafts 121 are driven to rotate in opposite directions and in synchronism, and the phase between the left- and right-hand chain pairs (as viewed in FIG. 7) is adjusted such that the support bars 128 provided on the left-hand chain pair are always kept to be level with their corresponding support bars 128 provided on the right-hand chain pair.

One of the support bars 128 provided on the left-hand chain pair (as viewed in FIG. 7) and the corresponding support bar 128 provided on the right-hand chain pair together form a support bar pair. Each pair of support bars 128 supports a tray J carrying a sintering mold a1, so that a plurality of sintering molds a1 may be stored in the sintering mold dispenser unit 12. For dispensing a sintering mold a1, the drive motor 123 is operated to move the chains 127 a predetermined distance at a time, and in directions as indicated by respective arrows in FIG. 7, so that the trays supported by the support bar pairs are lifted down and the lowest of the trays is dispensed onto the receiving plate 230 of the carrier 223, which is then located under the sintering mold dispenser unit 12.

Figure 9:
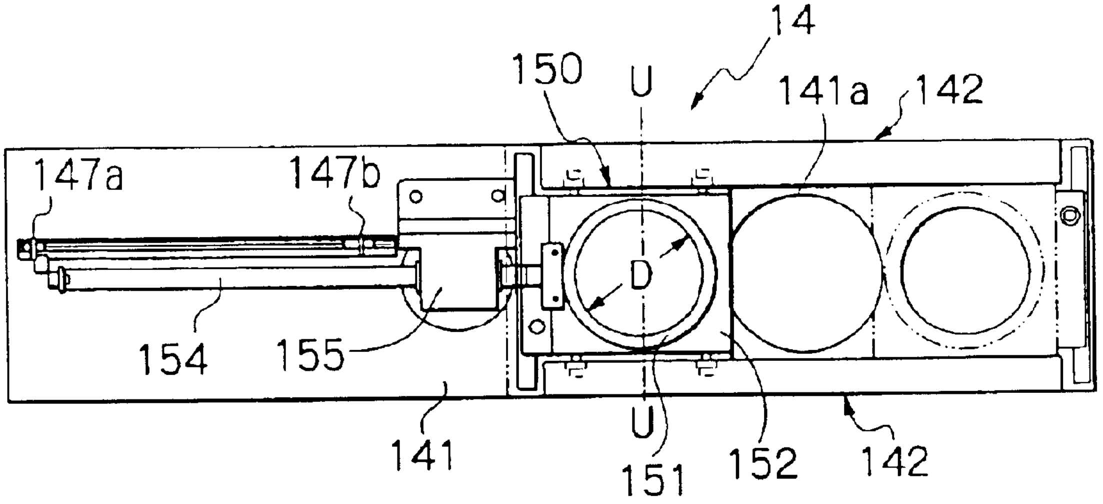
FIG. 9 is a plan view of a powder filling mechanism.
Figure 10:
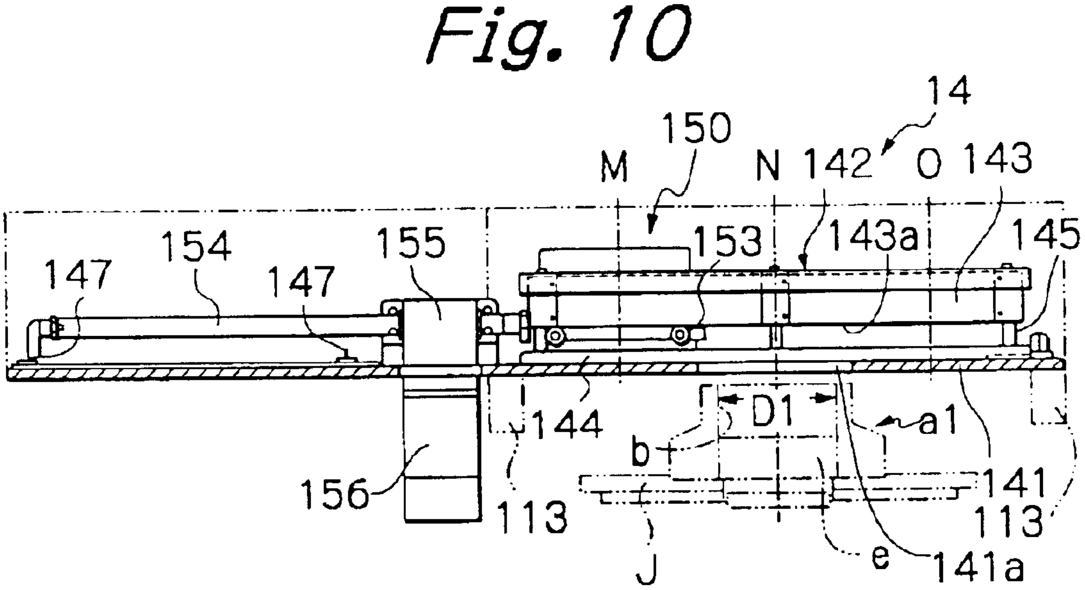
FIG. 10 is a longitudinal section view of the powder filling mechanism of FIG. 9.
Figure 11:
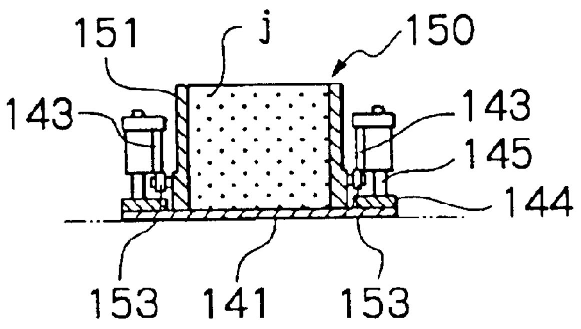
FIG. 11 is a cross section view of the powder filling mechanism of FIG. 9 taken along line U—U of FIG. 9.

The powder filling mechanisms 14 are arranged in line along the transportation path of the carrier 223. The number of the units 14 should be equal or greater than the number of different powder materials to be used. Since the powder filling mechanisms 14 have the same construction and are used to provide identical functions, only one of them is described in detail. With reference to FIGS. 9, 10 and 11, the frame 11 includes a pair of upper beams 113 (FIG. 10) extending in the longitudinal direction of the frame 11, i.e., parallel to the guide rails 221. As shown, the powder filling mechanism 14 comprises a generally rectangular, support plate 141 horizontally fixed on the upper beams 113 of the frame 11 in a known manner. The support plate 141 extends perpendicular to the running direction of the carrier 233 and over the transportation path of the sintering mold a1 conveyed by the carrier 223. The powder filling mechanism 14 further comprises a pair of horizontal, hopper guide rails 142 mounted on the top surface of the support plate 141 and spaced apart in the running direction of the carrier 223 and a movable hopper 150 provided on the support plate 141 and between the hopper guide rails 142. The hopper guide rails 142 extend perpendicular to the running direction of the carrier 223 and over the transportation path of the sintering mold a1. The movable hopper 150 is supported and guided by the hopper guide rails 142 for horizontal displacement. The support plate 141 has an opening 141*a* (of a circular shape in the embodiment) formed therein. The opening 141*a* is formed at such position that a sintering mold placed on the carrier 223 may be in alignment therewith, when the carrier 233 has been brought to the powder filling position of the powder filling mechanism 14. Further, the opening 141*a* is so sized as to be capable of receiving the top end of the sintering mold without any substantial clearance therebetween. Each of the hopper guide rails 142 includes: a guide plate 143 defining a horizontal guide surface 143*a* facing downward; a base plate 144 secured to the support plate 141 in a known manner; and a plurality of support rods 145 interconnecting the guide plate 143 and the base plate 144 with a space left therebetween.

The movable hopper 150 comprises a hollow cylindrical body 151 having an inner diameter substantially equal to or somewhat greater than that of the bore b of the sintering mold a1 and having a bottom flange 151 extending radially outwardly. The bottom flange 151 has a rectangular outer contour as seen in plan, which is nearly square having four sides, of which a pair of opposite sides extend along the hopper guide rails 143. Two rollers 153 are provided on each of these sides of the bottom flange 151, for rolling on the guide surface 143*a* of the corresponding one of hopper guide rails 143. The rollers 153 (four, in total) are always in engagement with the guide surfaces 143*a*, which faces downward as described above, so that the movable hopper 150 is effectively prevented thereby from rising apart from the top surface of the support plate 141. The body 151 of the movable hopper 150 is filled with a powder material. While it is generally preferable that the inner cavity of the hopper body 151 has a cross section corresponding to that of the sintering mold into which the powder material is to be filled from the movable hopper 150, other cross sections may be also used to achieve acceptable results. For example, for a sintering mold having a hollow cylindrical body with a circular cross section, we may use a hopper having a tubular body with a square cross section. Further, the cross section of the inner cavity of the hopper body 151 may preferably have a size which is either equal to or somewhat greater than that of the cross section of the bore of the sintering mold to be used. Thus, if both of their cross sections are circular, the preferable relationship may be expressed as $D1 \leqq D2$, where D1 and D2 stand for the inner diameters of the bore of the sintering mold and the inner cavity of the hopper body, respectively.

The movable hopper 150 his a rod 154 having one end connected to the movable hopper 150 on one side (the left-hand side as viewed in FIGS. 9 and 10) of the movable hopper 150 and extending parallel to the hopper guide rails 142 (i.e., in the horizontal direction as viewed in FIGS. 9 and 10). The rod 154 is supported by a linear bearing 155 for sliding movement along the longitudinal direction of the rod 154, with the linear bearing 155 being fixedly mounted on the support plate 141. The rod 154 is driven for reciprocal linear motion by means of a drive motor 156 and a suitable drive mechanism of a known type (not shown). The drive mechanism may be a rack-and-pinion drive comprising rack-teeth formed on the rod 154 and a pinion in engagement with the rack-teeth and driven by the drive motor 156 for rotation in both directions. Such a drive mechanism may be preferably housed within the casing of the linear bearing 155. The position of the rod 154 and thus the position of the movable hopper 150 is detected by a pair of position sensors 147*a* and 147*b*, which are mounted on the support plate 141 at position spaced apart in the moving direction of the rod 154.

The powder filling mechanism 14, having the arrangement as described above, operates as follows. When ready for operation, the movable hopper 150 has a sufficient amount of powder material j stored in the cavity of the body 151 and is positioned at one of two waiting positions M and O shown in FIG. 10. The carrier 223, which has a sintering mold a1 and an associated tray J placed thereon, is driven to bring the sintering mold a1 to the powder filling position of the powder filling mechanism 14. Then, the lift motor 239 on the carrier 223 is operated to lift up the assembly composed of the receiving plate 230 and the four vertical posts 229, until the top end of the sintering mold a1 on the tray J enters in the opening 141*a* of the support plate 141 and the top surface c of the sintering mold a1 becomes substantially level with (or flush with) the top surface of the support plate 141. Simultaneously, the drive motor 235 on the carrier 223 is operated to rotate the screw spindle 236 to lift up the lift plate 233 together with the push-up member 234 relative to the receiving plate 130 and thereby to displace the lower press core e upward relative to the sintering mold a1, until the top surface of the lower press core e is raised to reach the level with which the distance (or depth) of the top surface of the lower press core e from the top surface c of the sintering mold a1 becomes a desired distance (or desired depth). In order to prevent rise of the sintering mold when the lower press core is displaced upward in the sintering mold, the powder filling mechanism 14 is provided with a clamp (not shown) for gripping the sintering mold to secure it to the powder filling mechanism 14. The "desired" depth of the top surface of the lower press core from the top surface of the sintering mold a1 depends on the desired amount of powder material to be filled into the sintering mold or the desired thickness of the powder layer to be formed in the sintering mold. On the other hand, the "actual" depth of the top surface of the lower press core from the top surface of the sintering mold a1 may be controlled base on the measurement of the vertical position of the push-up member 234 relative to the vertical position of the receiving plate 230, with knowledge of the height of the sintering mold a1 and the height (or thickness) of the lower press core. Then, the movable hopper 150 is operated to make a stroke of movement from the position M to the position O or vice versa. During this stroke, the bottom opening (or mouth) of the inner chamber of the movable hopper 150 passes through the top opening (or mouth) of the bore b of the sintering mold a1, then an amount of powder is filled into the bore b of the sintering mold a1 from the movable hopper 150. When the movable hopper 150 reaches either of the positions M and O, the powder filling operation is completed. Because the bottom surface of the movable hopper 150 is kept in contact against the top surface of the support plate 141 during its stroke, the amount of powder material just filled into the sintering mold a1 has a flat top surface which is level with the top surface of the sintering mold a1. Thus, the edge of the bottom surface of the movable hopper 150 serves as a strickle for strickling off any excessive amount of powder material to the level of the top surface of the sintering mold a1. After completion of the powder filling operation, the receiving plate 130 of the carrier 223 is lowered together with the sintering mold. The lower press core is fitted tight into the bore of the sintering mold so that a significant force is needed for causing displacement of the press core relative to the sintering mold, with the result that any unintended lowering of the lower press core relative to the sintering mold will never be caused by gravity. Thus, in the case where a hydraulic cylinder is used in place of the lift motor 235 for lifting up/down the push-up member 234, once the push-up member 234 is raised to set the lower press core to a desired position for the powder filling operation for the first powder layer in the sintering mold, it is no longer necessary to retain the push-up member 234 at that position but the push-up member 234 may be lowered.

With reference again to FIGS. 4 and 6, the measure unit 16 comprises: a horizontal support plate 161, which is fixedly mounted on the upper beams 113 of the frame 11 and extends over the transportation path of the carrier 223; four bearing sleeves 162*a* fixedly mounted on the support plate 161; and four vertical rods 162 supported by the respective bearing sleeves 162*a* for vertical displacement. The four bearing sleeves 162*a* are provided on the support plate 161, with two of them being located at each end (each of the right- and left-hand ends as viewed in FIG. 4) of the support plate 161. The measure unit 16 further comprises: a connecting plate 163 secured to the upper ends of the vertical rods 162; a load sensor 164 secured to the support plate 161 at the middle point of the support plate 161; and a pusher 165 fixedly attached to the connecting plate 163 for pushing down the top end of the load sensor 164. Each of the vertical rods 162 has a support bar 166, which is connected at the lower end of the associated vertical rods 162 and extends horizontally toward the transportation path of the carrier 223. Vertical guide rods 167 for guiding counterweights 168 in vertical direction are fixedly connected to the support plate 161. A support bar 166 extending toward the carrier is fixed to the lower end of each of the vertical rods. The support bars 166 are connected to the counterweights 168 through cables 169, such that the total weight of the vertical rods 162, the connecting plate 163, the sintering mold and the tray is substantially balanced with the counterweights 168, in order to prevent any excessive load from acting on the load sensor 164. In operation, a sintering mold may be brought to the measuring position of the measure unit 16 each time the powder filling operation has been effected to the sintering mold. Alternatively, a sintering mold may be brought to the measuring position only when the powder filling operations for all the powder layers to be formed in the sintering mold have been done. In either case, when the sintering mold is brought to the measuring position by the carrier 233, the lift motor 239 in the carrier 223 is operated to lift down the receiving plate 230. When the receiving plate 230 is lifted down below the support bars 166, the sintering-mold-and-tray placed on the receiving plate 230 is passed to the support bars 166. The sintering-mold-and-tray is now supported solely by the support bars 166, and the total weight of the amounts of powder materials having been filled into the sintering mold so far is measured by the load sensor 164, which excludes the weights of the vertical rods 162, the connecting plate 163, the tray J, the sintering mold a1 and the lower press core e. Further, from the measurements thus obtained, the weight of the amount of powder material last filled into the sintering mold can be determined. The measurement operation may be performed either before or after the pressing operation which is described in detail below.

Figure 5B:
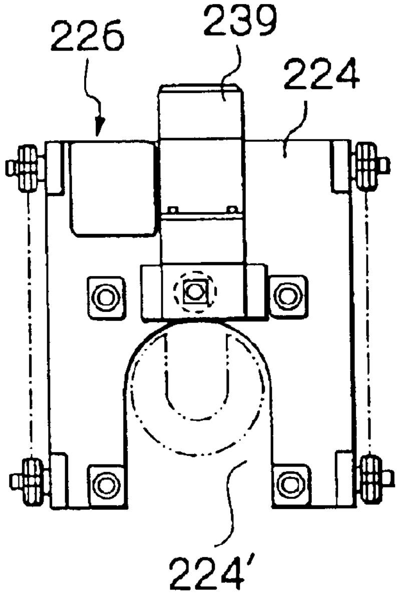
FIG. 5B is a section view of the carrier as viewed in the direction indicated by arrows B—B in FIG. 5A.
Figure 5C:
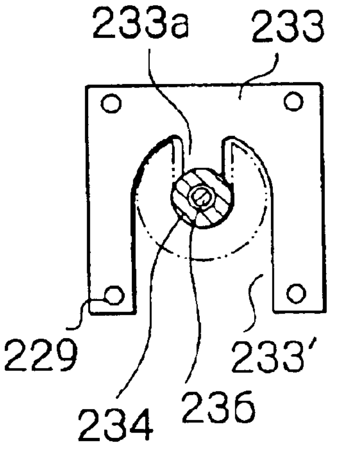
FIG. 5C is a section view of the carrier as viewed in the direction indicated by arrows C—C in FIG. 5A.
Figure 5D:
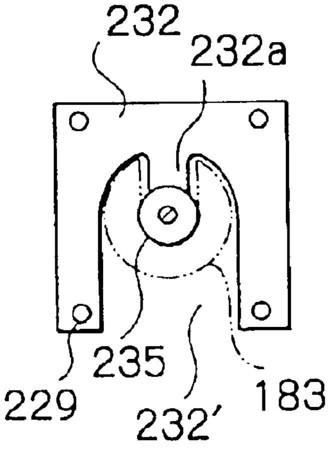
FIG. 5D is a section view of the carrier as viewed in the direction indicated by arrows D—D in FIG. 5A.
Figure 6:
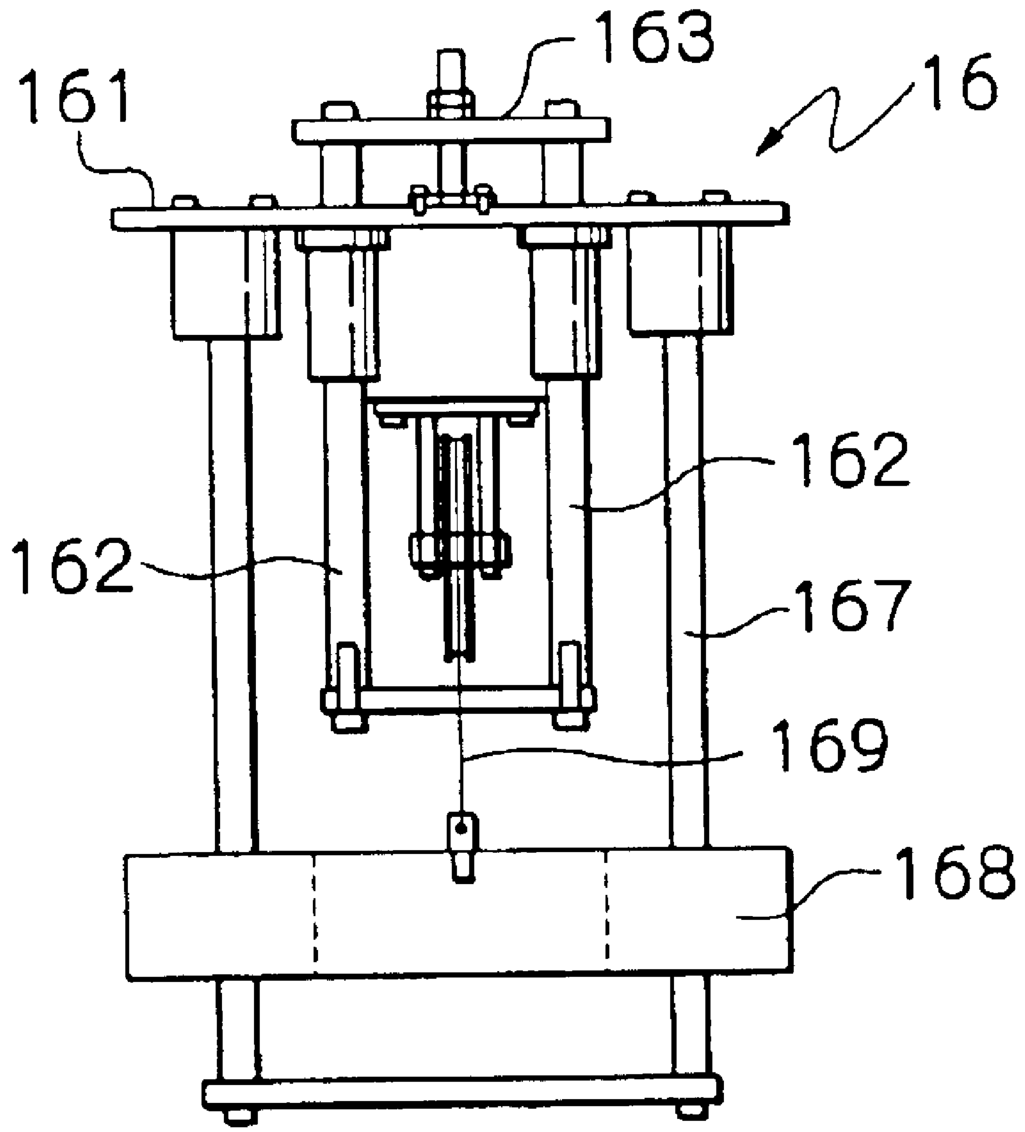
FIG. 6 is a side elevation view of the measure unit of FIG. 4 as viewed in the direction square to that in FIG. 4.
Figure 12:
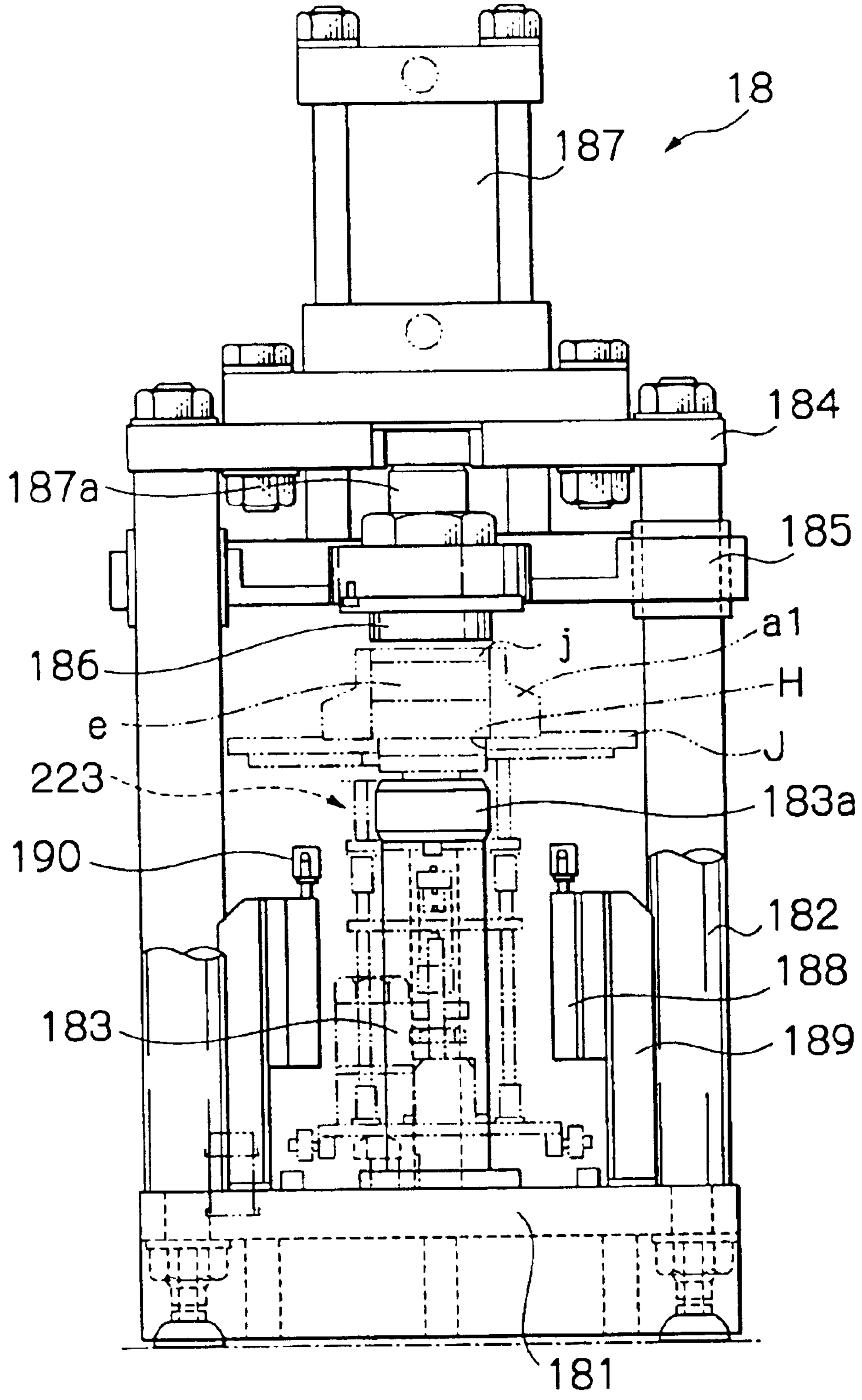
FIG. 12 is a front elevation view of a press unit.
Figure 13A:
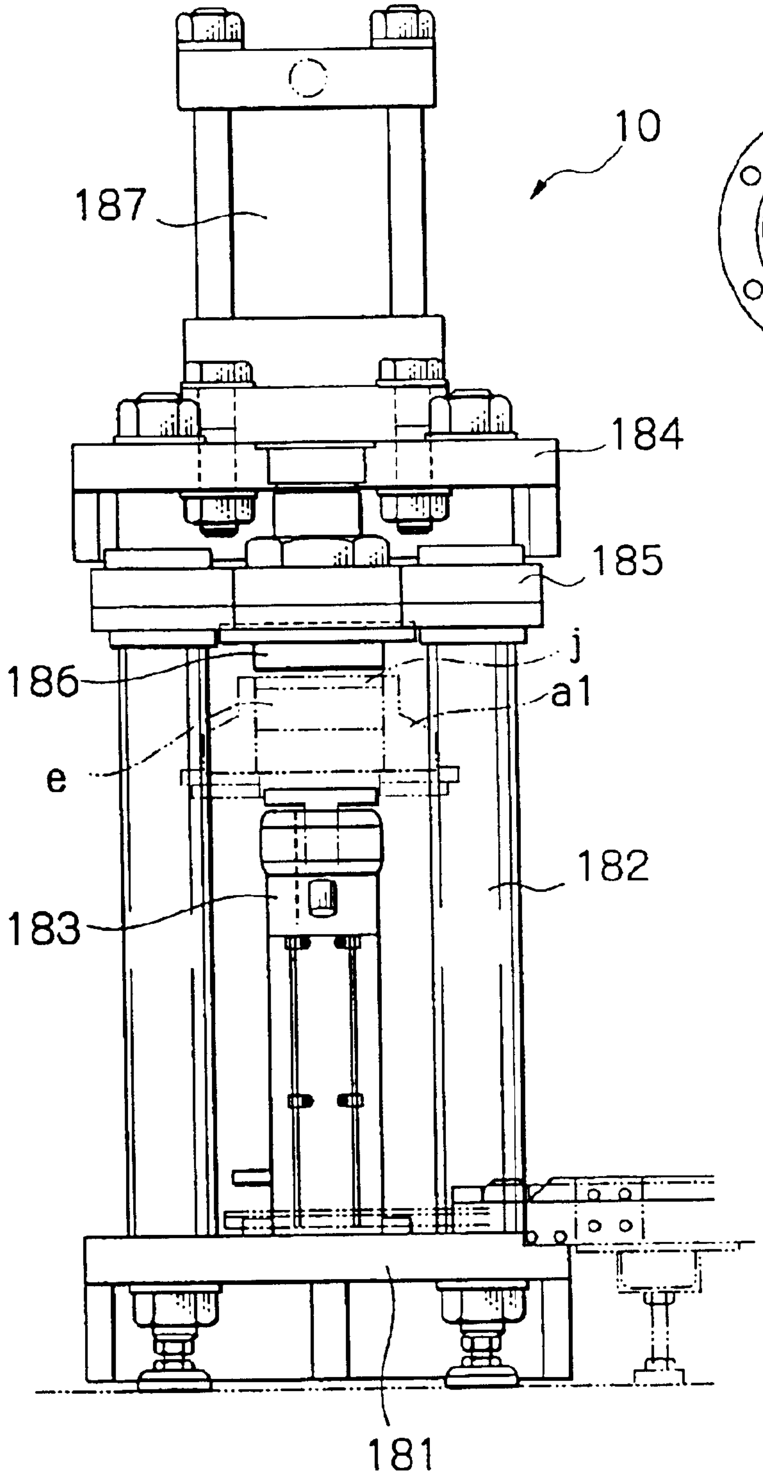
FIG. 13A is a side elevation view of the press unit of FIG. 12 as viewed in the direction square to the viewing direction of FIG. 12.
Figure 13B:
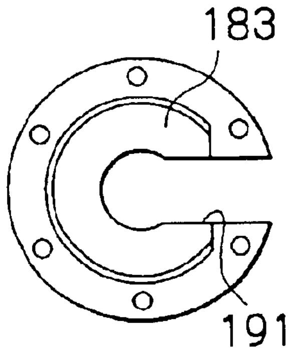
FIG. 13B is a enlarged plan view of the pedestal of the press unit of FIG. 12.

With reference to FIGS. 12 and 13, the press unit 18 comprises a rectangular base plate 181 which is separate from the frame 11; four upright columns 182 fixedly mounted on the base plate 181, one at each corner of the base plate 181; an upright pedestal 183 fixedly mounted on the base plate 181 at the center thereof; a top plate 184 supported by and connected to the upper ends of the columns 182; a press guide 185 guided by the columns 182 for vertical movement between the top plate 184 and the base late 181; an upper plunger or press member 186 fixedly mounted on the press guide 185; an hydraulic cylinder 187 secured to the top plate and having a piston rod 187*a* connected to the press guide 185. The base plate 181 is provided with a pair of guide rails (not shown) mounted thereon, the guide rails forming an elongation of the guide rails 221 mounted on the under frame members 111 of the frame 11, so that the carrier 233 may be operated to run not only along the guide rails 21 on the frame 11 but also along the guide rails on the base plate 181. The pedestal 183 has a top end 183*a* which is so shaped and sized as to be received in the opening 131 of the receiving plate 130 of the carrier 223 as well as in the opening H formed in the tray J. The pedestal 183 is of a hollow cylindrical shape and has a cutout 191 formed therein, as shown in FIG. 13B. The cutout 191 faces the direction from which the carrier approaches the pedestal 183 and forming a through path between the inside and the outside of the hollow cylindrical pedestal 183. When the carrier 223 has reached the pressing position of the press unit 18, the cutout 191 allows a pail of the carrier 233 to enter the inside space of the pedestal 183, which part includes the cylindrical stem portion of the push-up member 234, the drive motor 235, the central portion 232*a* of the mount plate 232 and the central portion 233*a* of the lift plate 233 (see FIGS. 5C and 5D). Further, when the carrier 223 is in this position, the top flange 234*b* of the push-up member 234 extends above the top, circular edge of the pedestal 183, with the axis of the push-up member 234 and being substantially in alignment with the axis of the pedestal 183. In addition, when the carrier 223 is in this position, the pedestal 183 is received in the recess or cutout 233' formed in the lilt plate 233 of the carrier 223 (FIGS. 5B and 5D). The upper plunger or press member 186 has a lower end so shaped and sized as to be fitted tight in the bore b of the sintering mold a1. The press unit 18 further comprises a pair of hydraulic cylinders (lift cylinders) 188 mounted on the base plate 181 through respective brackets 189 at positions on opposite sides of the pedestal 183. The hydraulic cylinders 188 are supported by the corresponding brackets 189 with their piston rods 188*a* extending upward. A pair of support members 190 are attached to the upper ends of the piston rods 188*a*, respectively.

In operation, when the press unit 18 is in a condition to wait for a sintering mold to arrive, the press guide 185 having the upper plunger 186 mounted thereon is placed at its upper position by means of the hydraulic cylinder 187, while the lift cylinders 188 are controlled such that their piston rods 188*a* are in their retreated position. When the carrier 223 arrives at the pressing position of the press unit 18, the pedestal 183 is received in the recesses 224',232' and 233' of the base plate 224, the mount plate 232 and the lift plate 233, respectively, while the cylindrical stem portion of the push-up member 234, the drive motor 235, the central portion 232*a* of the mount plate 232 and the central portion 233*a* of the lift plate 233 together enter the inside space of the pedestal 183 through the cutout 191. When the carrier 223 has reached the pressing position, the axis of the push-up member 234 is substantially in alignment with the axis of the pedestal 183 and the top flange 234*b* of the push-up member 234 extends above the top edge of the pedestal 183. Then, the lift motor 239 is operated to lower the receiving plate 230 of the carrier 223 and thus lower the tray J on which a sintering mold a1 is placed, until the under surface of the top flange 234*b* of the push-up member 234 come into engagement with the top of edge of the pedestal 183, when the top surface of the top flange 234*b* remains in contact with the bottom surface of the lower press core e fitted in the sintering mold, so that the sintering mold a1 is thereby supported with the lower press core e fitted therein and the amount of powder material filled therein. Then, the hydraulic cylinder 187 is operated to lower the press guide 185 and the upper plunger or press member 186 along the columns 182, so that the powder material filled into the sintering mold is pressed by the upper plunger 186 at a desired pressure and for a desired length of time.

When the pressing operation has been done, the powder material in the sintering mold has been more or less compacted, so that the top surface of the resultant powder compact has been sunk from the initial level, i.e., the level of the top surface c of the sintering mold. This sinkage can be measured by detecting the relative vertical displacement of the bottom surface of the upper plunger 186 with respect to the top surface of the sintering mold. The detection may be achieved by using a suitable sensor, such as a touch sensor. The sinkage produced by the pressing operation is much less than the thickness of any powder layer which may be possibly formed next in the sintering mold. Therefore, if another powder layer is to be formed on the layer of the powder compact, the powder compact has to be displaced downward relative to the sintering mold in order to allow for the powder filling operation for the next powder layer (the sinkage produced by compaction of the powder compact plus the subsequent downward displacement of the powder compact relative to the sintering mold will be equal to the thickness of the next powder layer). Thus, with the lower press core and the powder compact being kept pressed between the pedestal 183 and the upper plunger 186, the lift cylinders 188 are operated to extrude their piston rods 188*a* upward, with the result that the support members 190 attached to the upper ends of the piston rods 188*a* come into engagement with the receiving plate 230 of the carrier 223 so as to lift up the receiving plate 230. Simultaneously, the hydraulic cylinder 187 is operated to lift up the upper plunger 186 at the same rate as the receiving plate 230, so that the powder compact is kept pressed. Further, at the same time, the lift motor 239 is operated in direction to lift up the receiving plate 230 (the push-up member 234 is lifted up together with the receiving plate 230). The operations above continue until the receiving plate 230 of the carrier 233 is lifted up to reach the level at which the receiving plate 230 is maintained during conveyance of a sintering mold. When the level is reached, the upper plunger 186 and the push-up member 234 are now displaced downward relative to the sintering mold, with the powder compact being kept pressed therebetween, until the amount of the downward displacement of the push-up member 234 reaches the desired amount (which depends on the selected amount of powder material to be filled for the next powder layer). In this manner, the powder compact is displaced downward relative to the sintering mold a1. The amount of the downward displacement of the powder compact can be detected by measuring the displacement of the push-up member 234. In the case where the powder compact to be formed is a non-multi-layered powder compact so that only a single powder layer needs to be formed in the sintering mold (such a powder layer usually has a greater thickness than any powder layer in a multi-layered powder compact), the amount of the upward displacement of the tray and the sintering mold thereon is controlled such that the vertical position of the powder compact relative to the sintering mold will be the most suitable position for the sintering operation subsequently performed. In order to perform another powder filling operation for the next powder layer following the powder filling and pressing operations for the previous powder layer, the push-up member 234 is displaced downward relative to the receiving plate 230 by the distance corresponding to the thickness of the next powder layer. (However, the pushup member 234 may be further lowered to the waiting position if the under press core need not be supported during the next powder filling operation.) Also, in the case where the powder compact to be formed is a multi-layered powder compact so that a plurality of powder layers need to be formed in the sintering mold, following the powder filling and pressing operations for the last powder layer, the amount of the upward displacement of the tray and the sintering mold thereon is controlled such that the vertical position of the powder compact relative to the sintering mold will be the most suitable position for the sintering operation subsequently performed. It is noted that the fit of the upper plunger 186 in the bore of the sintering mold is a tight fit (in order to prevent escape of any powder which could otherwise occur through a clearance between the bore and the upper plunger 186), the upper plunger 186 tends to drag upward the sintering mold when lifted up for removal from the sintering mold. In order to prevent the drag of the sintering mold by the upper plunger 186, a clamping mechanism (not shown) is provided on the press unit 18 for clamping the sintering mold when the upper plunger 186 is lifted up for removal from the sintering mold.

Figure 14:
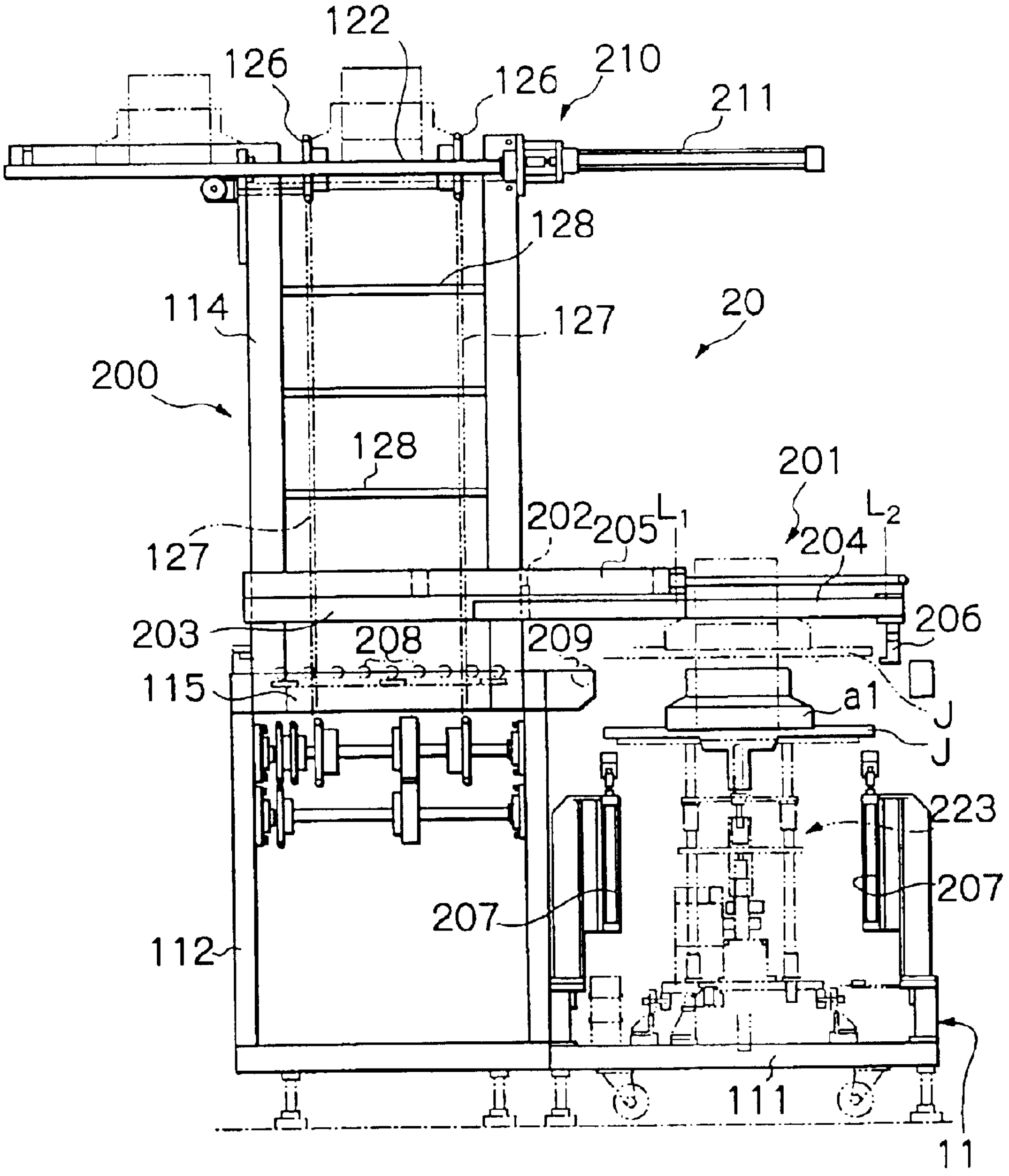
FIG. 14 is a side elevation view of a sender unit.
Figure 15:
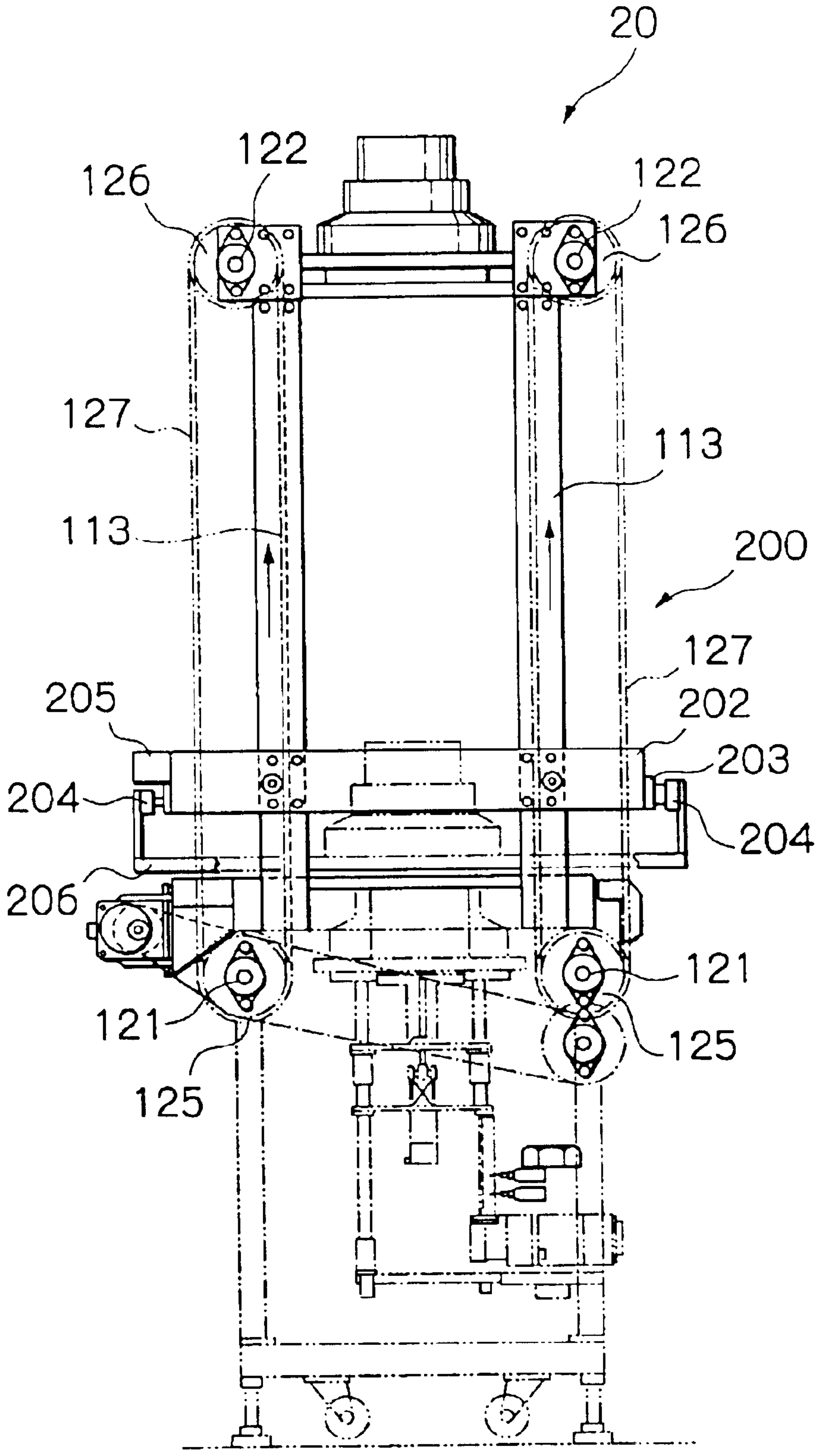
FIG. 15 is a front elevation view of the sender unit of FIG. 14 as viewed in the direction square to the viewing direction of FIG. 14.

With reference to FIGS. 14 and 15, the take-out unit 20 serves to sequentially pick up from the carrier 223 trays with sintering molds having been subjected to the pressing operation in the press unit 18 and send them to the next process station. The take-out unit 20 comprises an elevator 200 having a construction similar to the elevator 120 of the sintering mold dispenser unit 12; therefore, like parts and elements are designated by like reference numerals and not described in detail for simplicity. A primary difference between the elevator 200 of the take-out unit 20 and the elevator 120 of the sintering mold dispenser unit 12 resides in that the latter serves to sequentially lift down trays with sintering molds placed thereon (i.e., sintering-mold-and-trays) and dispense them onto the carrier 233, while the former serves to sequentially pick up or take out sintering-mold-and-trays from the carrier 223 and lift up them to a conveyor line. The take-out unit 20 further comprises a first transfer mechanism 201 for transferring a sintering-mold-and-tray from the carrier 223 to the elevator 200 and a second transfer mechanism 210 for transferring a sintering-mold-and-tray from the elevator 200 to the conveyor line for conveying them to the next process station.

The first transfer mechanism 201 comprises: a pair of horizontal guide rails 203, which are disposed on opposite sides of the elevator 200 and fixedly mounted on an upright sub-frame 114 of the frame 11 through brackets 202; a pair of slide heads 204 supported and guided by the guide rails 203, respectively, for movement along the guide rails 203; and a hydraulic cylinder (serving as an actuator) 205, which is fixedly mounted on the bracket 202 to extend parallel to and along one of the guide rails 203 (the one disposed on the left-hand side as viewed in FIG. 15). The ends of the slider heads 204 (the right-hand ends as viewed in FIG. 14) are interconnected through a pushing cross bar 206 extending therebetween. The pushing cross bar 206 serves to push a tray J (having a sintering mold placed thereon) in a horizontal direction toward a position at which the tray can be taken and lifted up by the elevator 200. The hydraulic cylinder 205 has a piston rod 205*a*, which is connected at the tip end thereof to an end of that one of the slide heads 204 which is the nearer to the hydraulic cylinder 205 than the other. Thus, reciprocation movement of the piston rod 205*a* causes the corresponding reciprocation movement of the slide heads 204 between positions L1 and L2 (shown in FIG. 14). The first transfer mechanism 201 further comprises a pair lift cylinders (hydraulic cylinders serving as actuators) 207 disposed on opposite sides of the transportation path of the carrier 223, for lifting up a tray J (having a sintering mold placed thereon) to the level for allowing the pushing cross bar 206 to push and move the tray J. The frame 11 includes a pair of horizontal beams 115 (only one of them is shown in FIG. 14) mounted on the pair of side members 112 of the frame 11. The first transfer mechanism 201 further comprises a plurality of feed rollers 208, 209 arranged in line (in horizontal direction in FIG. 14) and supported by the pair of horizontal beams 115 for rotation in a known manner. The feed rollers 208, 209 are capable of free rotation; when a tray J is pushed by the pushing cross bar 206, it is conveyed by means of the rollers 208, 209 to the position at which it can be picked up by the support bars 128 of the elevator 200.

The second transfer mechanism 210 comprises a launcher cylinder (a hydraulic cylinder serving as an actuator) 211 for launching a lifted-up tray from the uppermost position in the elevator 200 onto the conveyor line. In operation, when the carrier 223 carrying a tray has reached the take-out unit 20, the lift cylinder 207 is operated to lift up the tray. Then, the hydraulic cylinder 205 is operated to move the pushing cross bar 206 from the right to the left in FIG. 14, so that the tray is moved by the pushing cross bar 206 to the position at which the tray, having a sintering mold placed thereon, is loaded on the support bars 128 of the elevator 200. The tray thus loaded on the support bars 128 is lifted up by the elevator 200 to the uppermost position in the elevator 200, and then pushed out of the elevator 200 to the left in FIG. 14 and launched onto the conveyor line by the launcher cylinder 211.

Although not shown, there is provided near the location of the carrier 233 as indicated by imaginary lines in FIG. 14 a press core installer for fitting an upper press core m into the upper end portion of the bore b of a sintering mold, in which a finished powder compact is housed. The press core installer may comprise, for example, an industrial robot, which is operative to pick up an upper press core m by gripping its upper end; bring the upper press core m to the position just above the sintering mold a1, which is at this point of time placed on the carrier 233 located at the position as indicated by imaginary lines in FIG. 14; and lift down the upper press core m to fit it into the bore b of the sintering mold a1. Such an industrial robot is well known in the art and thus is not described in more detail here.

An exemplified sequence of operations provided by the apparatus 10 for loading powder material into a mold, constructed and arranged in accordance the first embodiment of the present invention will now be described in detail.

Sintering molds a1 are individually placed on associated trays J during transportation through the apparatus 10. As described, the trays J have an opening H formed therein. When the sintering mold dispenser unit 12 has dispensed onto the carrier 223 a tray J having a sintering mold a1 placed thereon, the carrier 233 is operated to move sequentially to the selected ones of the powder filling mechanisms 14 in the order appropriate for forming the plurality of powder layers in the sintering mold. When the carrier 223 is moved to the first of the selected powder filling mechanisms (typically, the carrier 223 is moved first to the powder filling mechanism located at the position A or position K), it is stopped under that powder filling mechanism and then positioned to the powder filling position of that mechanism with precision. Then, the receiving plate 230 is lifted up to raise the sintering mold a1 with the tray J to a predetermined level, at which the upper end of the sintering mold a1 is received in the opening 141*a* of the support plate 141 of the powder filling mechanism. At the same time, the push-up member 234 is lifted up a predetermined distance relative to the receiving plate 230 so as to raise the lower press core e to such a level that is appropriate for the filling of a desired amount of powder material into the sintering mold for the first powder layer. Then, the powder filling mechanism is operated in the manner described above so that the desired amount of powder material is filled into the bore of the sintering mold a1. When the powder filling operation has been done, the sintering mold is transported by the carrier 223 to the pressing position of the press unit 18, which then serves to press at a desired pressure the amount of powder material in the sintering mold, so as to form a pre-compressed powder compact. If another powder filling operation has to be carried out for the next powder layer to be formed in the sintering mold, either the sintering mold is displaced upward relative to the powder compact or the powder compact is displaced downward relative to the sintering mold while the powder compact is kept pressed, such that the vertical position of the powder compact within the sintering mold is adjusted to such a position that is appropriate for the filling of a desired amount of powder material into the sintering mold for the next powder layer. Then, the press unit 18 releases the sintering mold a1, and the carrier 223 transports the sintering mold a1 to the measuring position of the measure unit 16, at which the weight of the powder material in the sintering mold is measured in the manner described above.

This sequence of operations is repeated for each of the powder layers to be formed in the sintering mold, in which different powder filling mechanisms 14 and used for filling different powder materials into the sintering mold. The number of the total iterations of this sequence is equal to the number of the powder layers to be formed in the sintering mold. When the powder filling operation and the pressing or pre-compression operation for the last powder layer have been done, the vertical position of the finished, multi-layered powder compact within the sintering mold is adjusted to the position appropriate for the subsequent sintering process, by displacing the receiving plate 230 of the carrier 223 upward relative to the powder compact while the powder compact is kept pressed or retained by the press unit 18. Thereafter, the sintering-mold-and-tray having undergone the sequence of operations above is picked up from the carrier 233 by the sender unit 20.

Figure 16:
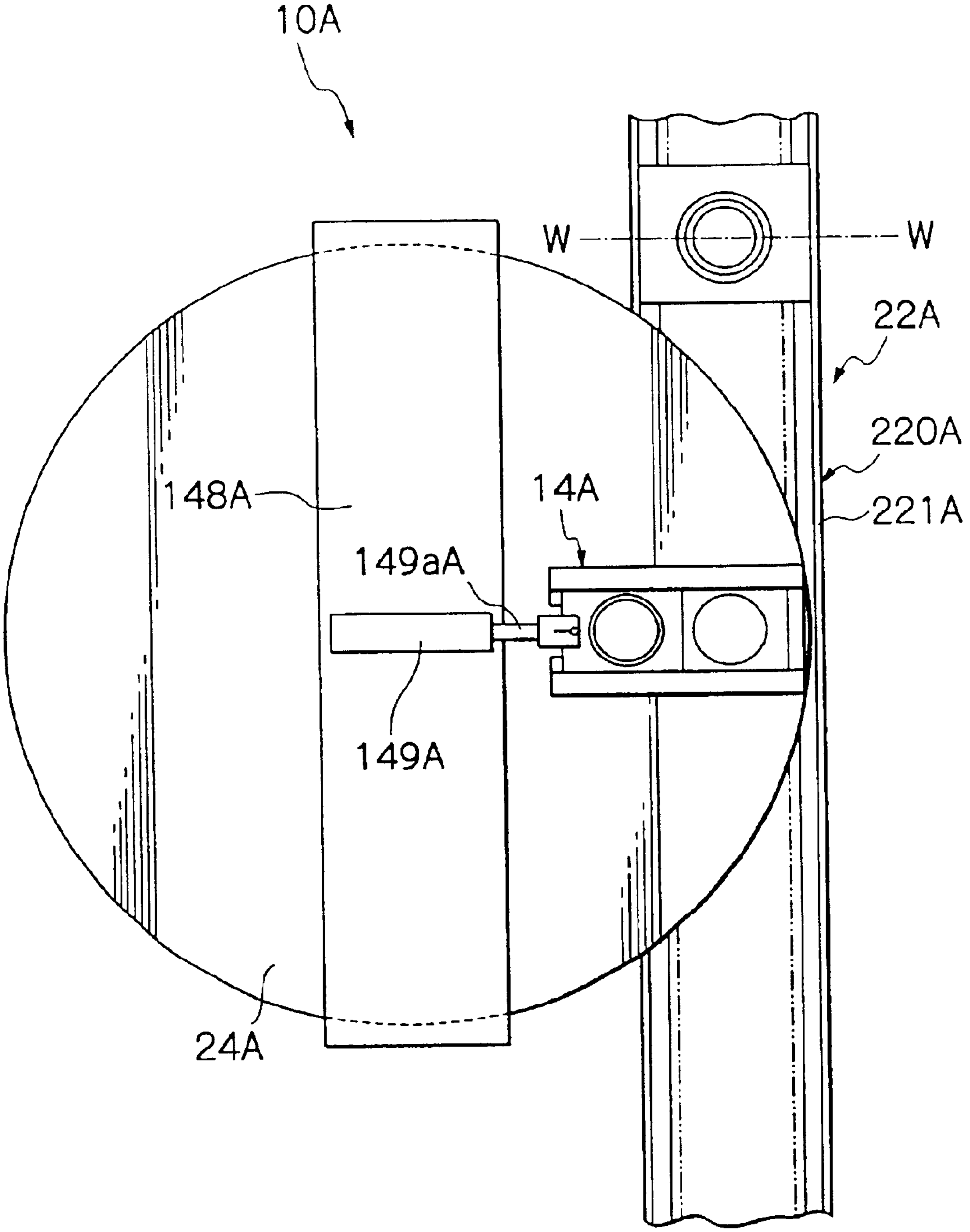
FIG. 16 is a schematic plan view of an apparatus for automatically loading powder material into a mold, constructed and arranged in accordance with a second embodiment of the present invention.

Referring next to FIGS. 16 to 20, we will describe an apparatus for loading powder material into a mold, constructed and arranged in accordance with a second embodiment of the present invention, together with an exemplified sequence of operations thereof carried out for loading powder materials into a sintering mold. FIG. 16 shows a schematic plan view of the automatic powder material loading apparatus 10A of the second embodiment. The automatic powder material loading apparatus 10A has a plurality of powder filling mechanism mounted on a rotary table so that different powder materials may be filled into and pressed within a sintering mold while the sintering mold is held at one position. This is a primary difference of the apparatus 10A from the that of the first embodiment described above. The automatic powder material loading apparatus 10A comprises a conveyor system 22A for conveying sintering molds together with associated trays along a predefined conveyance path; and a horizontal rotary table 24A supported for rotation about a vertical axis and driven for indexing movement by means of an indexing drive mechanism of a known type (not shown). The rotary table 24A partially extends over the conveyance path of the conveyor system 22A. The automatic loading apparatus 10A further comprises a lift/support unit 25A provided at a position at which a part of the rotary table 24A extends over the conveyor system 22A, for receiving a sintering mold from the conveyor system 22A and lifting up and supporting the received sintering mold; and a press unit 26A disposed above the lift/support unit 25A, for cooperating with the lift/support unit 25A to press at a desired pressure the amount of powder material filled into the sintering mold. The automatic powder material loading apparatus 10A further comprises a sintering mold dispenser unit (not shown) for dispensing sintering molds with associated trays onto the conveyor system 22A and a take-out unit (not shown) for picking up sintering molds with associated trays from the conveyor system 22A to send them to the next station, both of which are similar to those used in the first embodiment with apparent modifications effected thereto for meeting the requirements of the conveyor system 22A.

Figure 18:
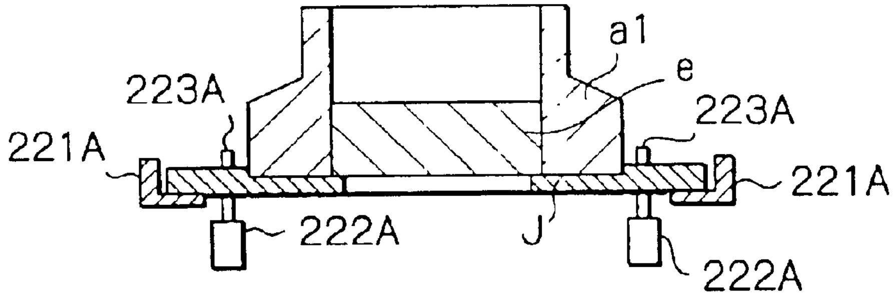
FIG. 18 is an enlarged section view of the apparatus of FIG. 16 taken along line W—W in FIG. 16.

With reference to FIGS. 16 and 18, the conveyor system 22A comprises a pair of horizontal guide rails 221A for supporting and guiding a tray J carrying a sintering mold, in which the tray J is supported at its side edges (with respect to the conveyance direction). The conveyor system 22A further comprises a driving device 220A for driving trays J supported by the guide rails 221A to move along the rails

221A. The driving device 220A may be a conventional chain drive comprising a pair of drive sprockets (not shown), a pair of idler sprockets (not shown) and a pair of endless chains 222A wound round these sprockets and extending along the respective guide rails 221A. Each endless chain 222A has a series of claws 223A (FIG. 18) provided therealong at constant intervals, for engaging with and pushing respective trays when the endless chain 222A is driven to circulate. The guide rails 221A may be provided with a series of rollers at constant intervals for facilitating smooth movement of the trays. Also, the guide rails 221A may be provided with a pair of sub-rails extending parallel to and above the guide rails for preventing trays from rising off the guide rails 221A.

Figure 19:
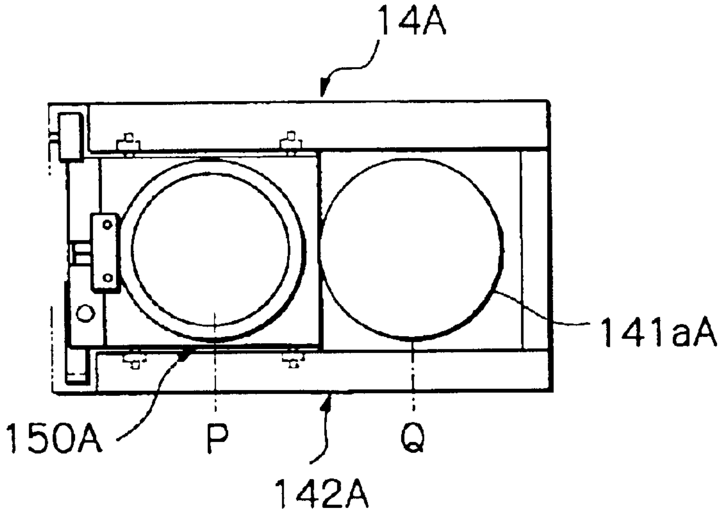
FIG. 19 is a plan view of a powder filling mechanism.
Figure 20:
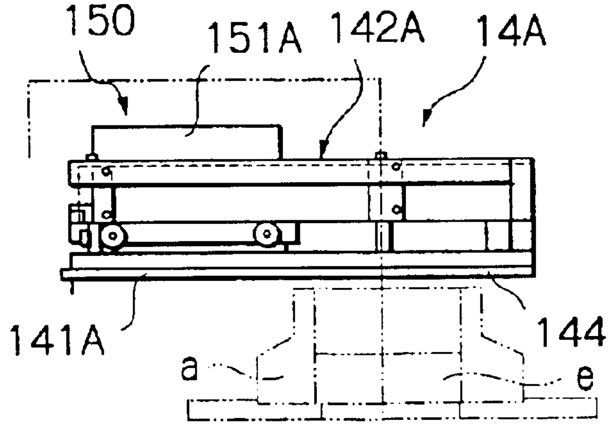
FIG. 20 is a section view of the powder filling mechanism of FIG. 19.
Figure 21:
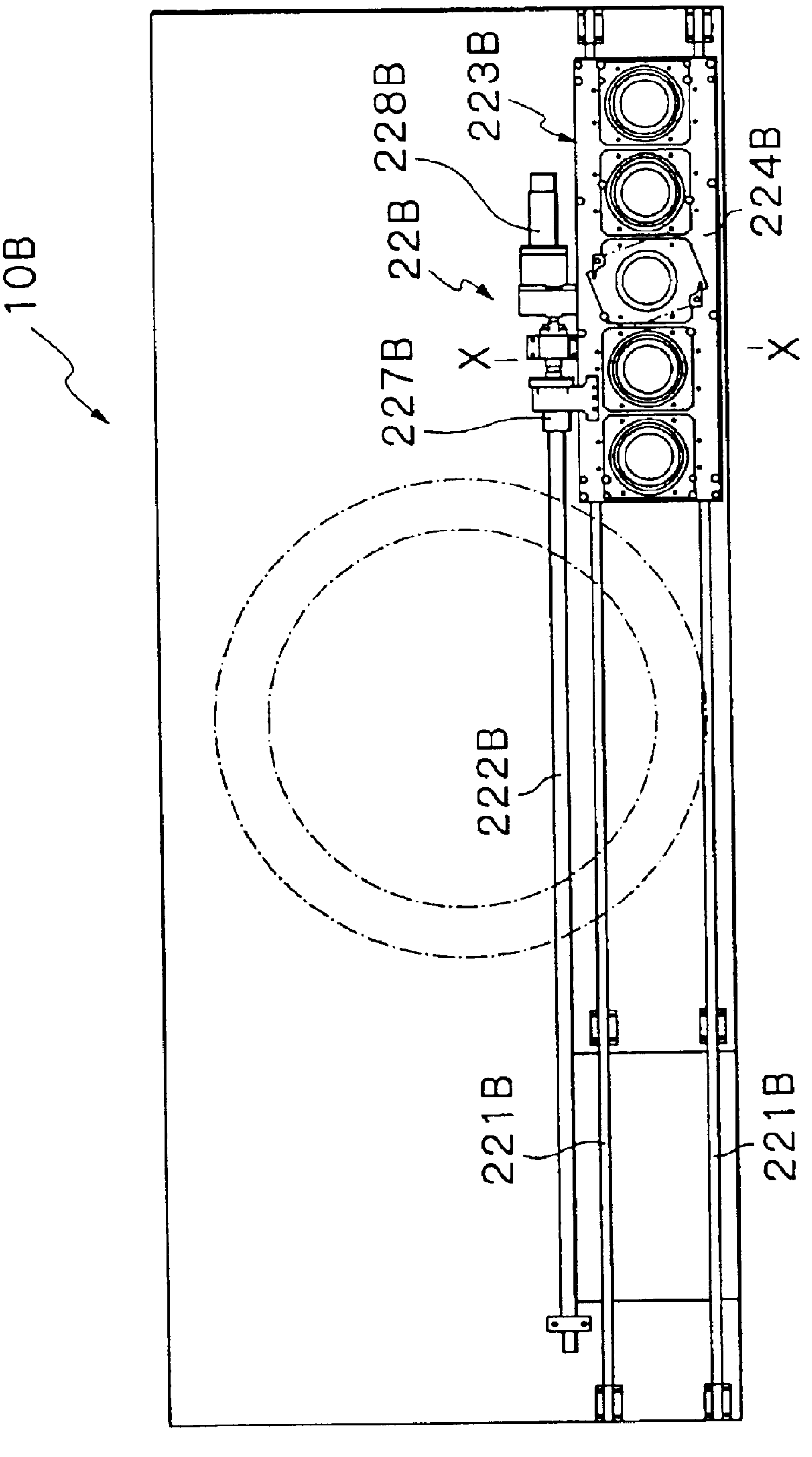
FIG. 21 is a schematic plan view of a part of an apparatus for automatically loading powder material into a mold, constructed and arranged in accordance with a third embodiment of the present invention.
Figure 22:
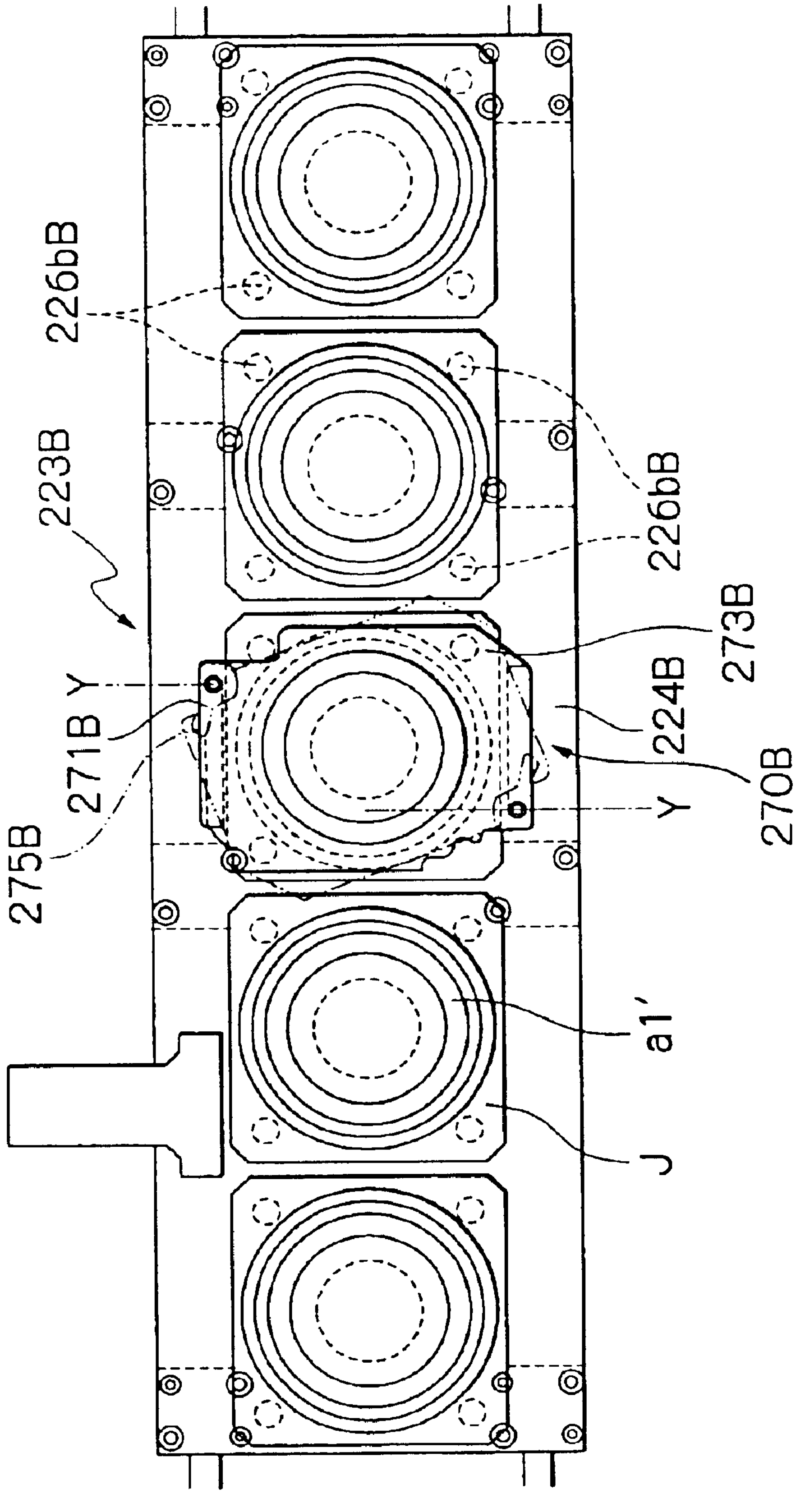
FIG. 22 is an enlarged plan view of a carrier used in the automatic powder material loading apparatus of FIG. 21.
Figure 23:
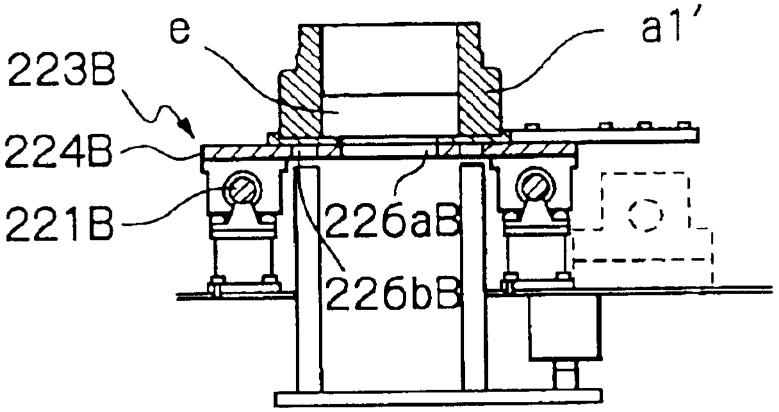
FIG. 23 is an enlarged cross section view taken along line X—X in FIG. 21.
Figure 24:
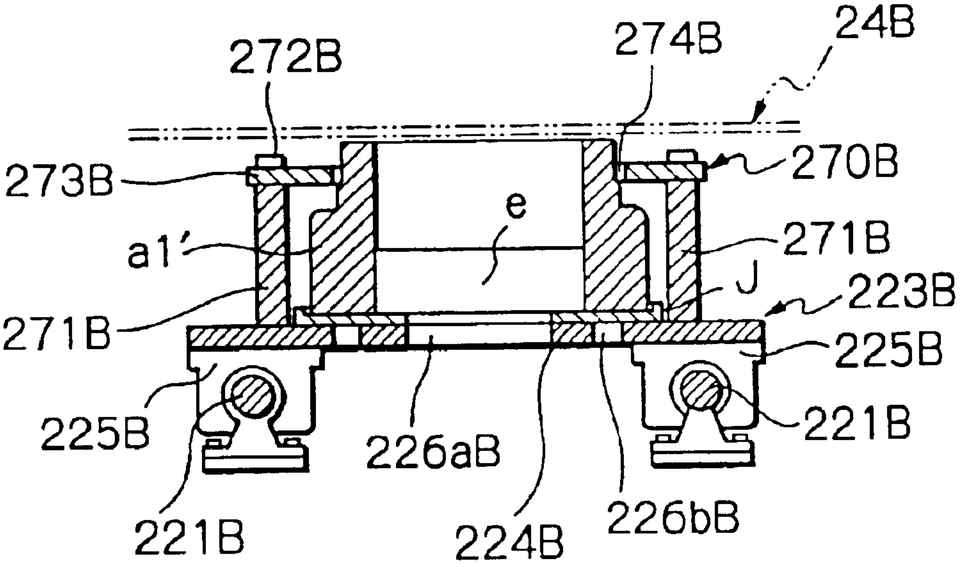
FIG. 24 is an enlarged cross section view taken along line Y—Y in FIG. 22.

With reference to FIGS. 19 and 20, the powder filling mechanism 14A is similar in construction to the powder filling mechanism 14 used in the first embodiment, except for some differences that the powder filling mechanism 14A comprises a movable hopper which is movable on a horizontal support plate between position P (at which the support plate has no opening) and position Q (at which the support plate has an opening) and that each powder filling mechanism 14A does not have its own hopper drive mechanism but a single hopper drive mechanism is used to drive any of the movable hoppers provided on the rotary table. In the following description, only these differences are described in detail, while like elements are not described in detail. The rotary table 24A, which is supported for rotation about the vertical axis as described above, has a plurality of openings 241A formed therein (FIG. 17) along its peripheral edge at constant angular intervals. The number of the openings 241A is equal to the number of the powder filling mechanisms 14A provided for the apparatus; however, FIG. 16 shows only one of the powder filling mechanisms 14A with the associated one of the openings 241A. A support frame 148A extend over the rotary table 24A. The hopper drive mechanism has an actuator comprising a hydraulic cylinder 149A with a piston rod 149*a*. The hydraulic cylinder 149A has a chuck of a known type attached to the tip end of the piston rod 149*a,* for selectively gripping one of the movable hoppers 150A. Each movable hopper 150A includes a hopper body 151A having an upright pin attached thereto, which is adapted to be gripped by the chuck of the hopper drive mechanism. When the rotary table 24A is indexed so as to bring a desired one of the powder filling mechanisms 14A to the powder filling position, the hopper drive mechanism is operated to grip the movable hopper 150A of that powder filling mechanism 14A by the chuck and moves the movable hopper 150A from position P to position Q and then back to position P so as to carry out the powder filling operation. As described above, the rotary table 24A is driven for indexing movement by means of the indexing drive mechanism of a known type (not shown), so that the rotary table is indexed or rotated about the vertical axis at constant intervals or at a predetermined pitch, which is equal to the pitch between adjacent two of the powder filling mechanisms 14A provided on the rotary table 24A.

Figure 17:
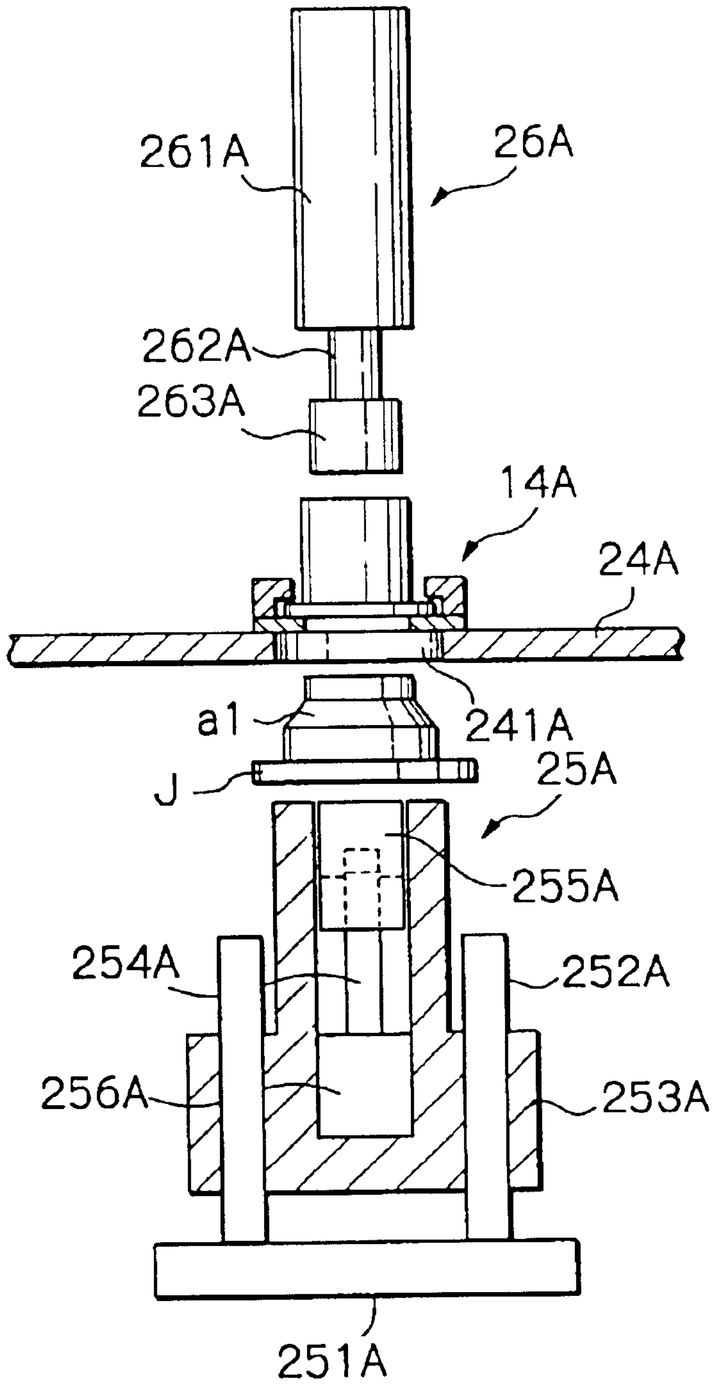
FIG. 17 is a section view of the apparatus of FIG. 16 taken along W—W in FIG. 16.

With reference to FIG. 17, the lift/support unit 25A comprises: a base plate 251A; a plurality of vertical guide rods 252A fixedly mounted on the base plate 251A; a lift bed 253A guided by the vertical guide rods 252A and driven by a feed screw mechanism of a known type (not shown) for vertical displacement; a vertical screw spindle 254A supported by the lift bed 253A and driven by a drive motor (an electric motor) 256A of a known type; and a lower plunger 255A guided by the lift bed 253A for vertical displacement. The lower plunger 255A is received in a center hole formed in the upper end of the lift bed 253A and is capable of projecting upward from the top surface of the lift bed 253A. The lower plunger 255A has a vertical threaded hole extending therethrough, with which the vertical screw spindle 254A is in thread engagement, so that by rotation of the screw spindle 254A the lower plunger 255A is lifted up/down relative to the lift bed 253A. The lower plunger 255A, when lifted up, enters in the opening 141*a*A of the support plate 141A of the powder filling mechanism 14A so as to push up the lower press core e fitted in the sintering mold. The upper end of the lift bed 253A is capable of engaging with the bottom of a tray so as to lift up the tray.

The press unit 26A comprises a press cylinder (an hydraulic cylinder) 261A, which is disposed just above the lift/support unit 25A and supported by a suitable support frame (not shown) and has a piston rod 262A extending in vertical direction. The press unit 26 further comprises an upper plunger or press member 263A attached to the tip end (i.e., the lower end) of the piston rod 262A. The upper plunger 263A of the press unit 26A and the lower plunger 255A of the lift/support unit 25A cooperate with each other to press the powder material in the sintering mold.

The automatic powder material loading apparatus 14A of the second embodiment operates as follows. When a sintering mold placed on a tray J has been conveyed to the powder filling position, the lift bed 253A of the lift/support unit 25A is lifted up to raise the tray J to a level at which the upper end of the sintering mold a1 is received in the opening 141*a*A of the support plate 141A and the top surface of the support plate 141A becomes level with the top surface of the sintering mold a1. Then, the lower plunger 255A is lifted up to displace upward the lower press core e fitted in the bore b of the sintering mold a1, until the distance (or depth) of the top surface of the lower press core e from the top surface of the sintering mold is reduced to a desired distance (or desired depth), which corresponds to the thickness of the first layer of powder to be filled into the mold. Then, the selected one of the powder filling mechanisms 14A is operated to carry out the powder filling operation for the first powder layer. When the powder filling operation has been done, the press cylinder 261A of the press unit 26A is operated to lower the upper plunger or press member 263A to press at a desired pressure the amount of powder material in the sintering mold, so as to form a powder compact of the first powder layer. Then, the upper and lower plungers or press member 263A and 255A are displaced downward while keeping the powder compact of the first layer in the sintering mold pressed therebetween, until the thickness of the space defined within the sintering mold and above the powder compact of the first powder layer is increased to reach a desired thickness (which corresponds to the thickness of the second layer of powder material to be filled next). Then, the upper plunger is lifted up to leave the sintering mold. The rotary table is then indexed to bring the powder filling mechanism 14A that stores the powder material for the second powder layer to the powder filling position, in order to allow that powder filling mechanism 14A to carry out the powder filling operation for the second powder layer. Thereafter, the sequence of operations described above is repeated for each of the powder layers to be formed in the sintering mold one on another. In this manner, a multi-layered powder compact is finished while the sintering mold is held at the powder filling position during the whole sequence of the powder filling operations. When the powder compact is finished, the upper and lower plungers 263A and 255A are lowered while keeping the finished powder compact in the sintering mold pressed therebetween, until the multi-layered powder compact is brought to a desired vertical position relative to the sintering mold. The whole sequence of operations for loading powder in the sintering mold is completed at this point of time. It is noted that the upper plunger 263A is fitted tight in the bore of the sintering mold in order to prevent escape of any powder from the sintering mold (if there were clearance between the outer surface of the upper plunger and the inner surface of the bore of the mold, some of the powder could possibly escape through the clearance), so that the upper plunger tends to pull up the sintering mold when lifted up. In order to prevent the sintering mold from being lifted up thereby, a clamp (not shown) is provided to grip the sintering mold to retain it at the powder filling position.

Referring next to FIGS. 21 to 25, we will describe an apparatus 10B for automatically loading powder material into a mold, constructed and arranged in accordance with a third embodiment of the present invention. The loading apparatus 10B comprises a rotary table, a plurality of powder filling mechanisms and a press unit, all of which have the same construction and function as those used in the second embodiment and thus are not described in detail. The automatic powder material loading apparatus 10B further comprises a conveyor system 22B. The conveyor system 22B comprises a pair of horizontal guide rails 221B and a carrier 223B guided by and capable of running along the guide rails 221B. The carrier 223B comprises a horizontal, rectangular, movable base plate 224B and a plurality of linear bearings 225B mounted on the movable base plate 224B. The linear bearings 225B are guided and supported by the guide rails 221B for sliding movement therealong. The movable base plate 224B has a plurality of (five, in this embodiment) openings **226*a*B formed therein. The movable base plate 224B also has four small holes for each opening 226*a*B, arranged around the associated opening 226*a*B along a circle at intervals of ninety degrees. The carrier 223B is driven to move along the guide rails 221B by means of a drive mechanism comprising a screw spindle 222B extending along one of the guide rails 221B and a nut 227B mounted on the carrier 223B and in thread engagement with the screw spindle 222B. The screw spindle 222**B is supported by bearings of a known type for rotation and is driven by an electric motor.

The movable base plate 224B has five stop mechanisms 270B one of each of the five openings **226*a*B, for limiting upward displacement of a sintering mold a1' placed on the movable base plate 224B. Each stop mechanism 270B comprises: a pair of support blocks 271B provided on opposite sides of the opening 226*a*B and fixedly mounted on the base plate 224B; a pair of engagement pins 272B each provided on the top of the associated one of the support blocks 271B and having a stem and a flat, enlarged head; and a stop member 273B capable of placement on and attachment to the tops of the support blocks 271B. The stop member 273B has a central opening 274B for receiving the upper portion of a sintering mold a1' and a pair of recesses 275B for receiving the stems of the engagement pins 272B. The stop mechanisms 270B is adapted for a manual setting. After a sintering mold a1' is placed in position on the movable base plate, the stop member 273B is placed on the lops of the support blocks 271B as shown by imaginary lines in FIG. 22, and then rotated in clockwise direction as viewed in FIG. 22 so that the stems of the engagement pins 272B are received in the recesses 275B. In this manner, setting of the stop mechanism 270**B is completed. This setting may be manually performed.

Figure 25:
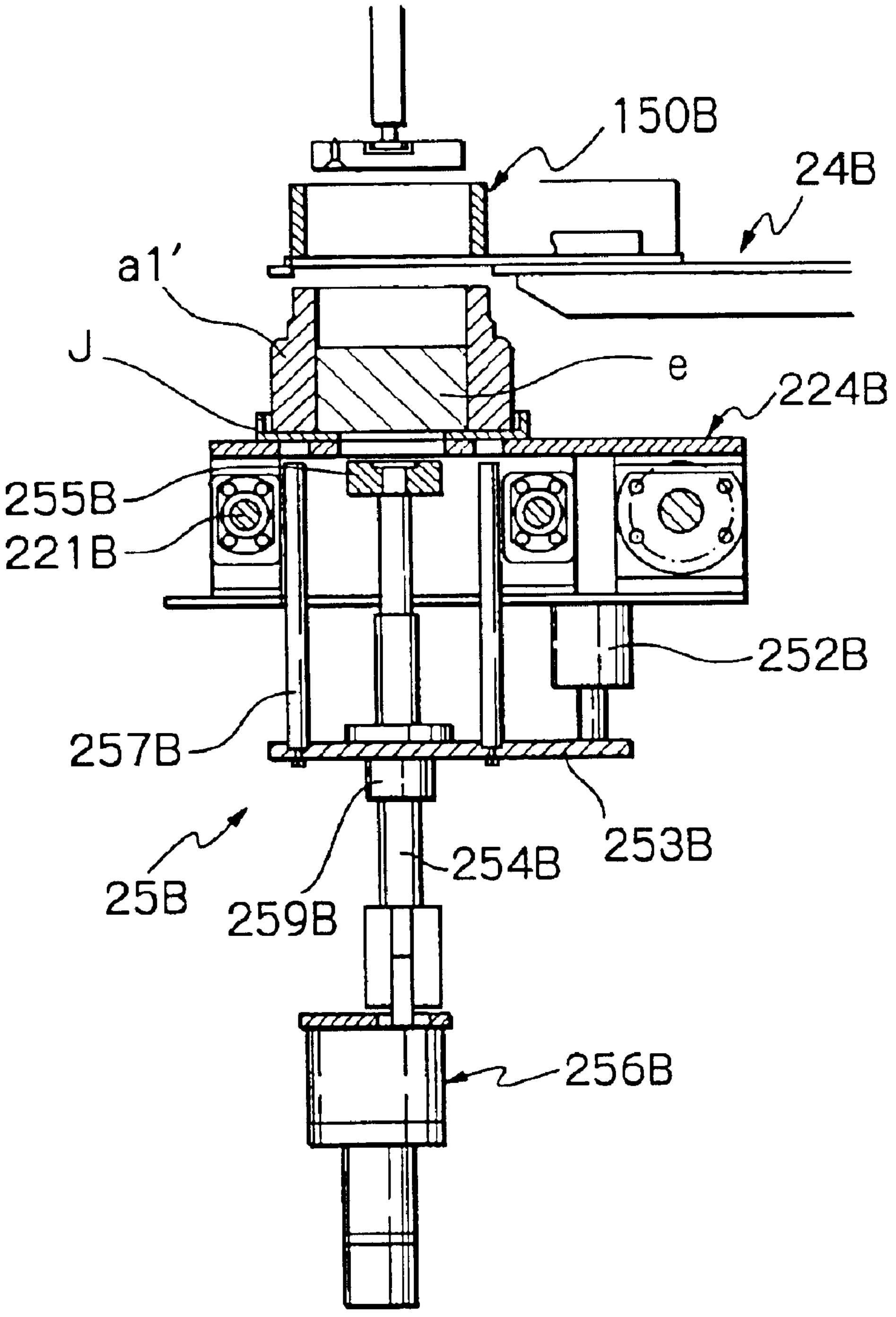
FIG. 25 is an enlarged cross section view of a lift/support unit used in the apparatus of FIG. 21.

With reference to FIG. 25, the lift/support unit 25B used in the powder material loading apparatus 10B of the third embodiment comprises: a lift plate 253B guided by vertical guide rods (not shown) for vertical displacement and a lift cylinder (a hydraulic cylinder serving as an actuator) 252B for lifting up/down the lift plate 253B. An electric drive motor 256B is supported by the lift plate 253B through guide members (not shown) for guiding the drive motor 256B for vertical displacement relative to the lift plate 256B. The drive motor 256B has a vertical output shaft, to which a vertical screw spindle 254B is fixedly connected. The lift plate 253B has a nut 259B fixedly mounted thereon, which is in thread engagement with the screw spindle 254B. A lower plunger or press member 255B is attached to the upper end of the screw spindle 254B. The lift plate 253B further has a plurality of (four, in this embodiment, of which only two are shown in FIG. 25) vertical push rods 257B fixedly connected thereto at their lower ends. The push rods 257B extend through respective holds **226*b*B formed in the movable base plate 224**B and serve to push up the bottom of a rectangular tray J (having a sintering mold placed thereon) at its four corners.

The lift/support unit 25B used in the powder material loading apparatus 10B of third embodiment operates as follows. When a sintering mold a1' is transported by the carrier 223B to the powder filling position, the lift cylinder 252B is operated to lift up the lift plate 224B, so that the push rods 257B connected to the lift plate 224B push up the tray J to raise the sintering mold a1' placed on the tray J. The upper portion of the sintering mold a1' thereby enters in the opening 144B of the support plate 141B of the powder filling mechanism 14B and the top surface of the sintering mold becomes level with the top surface of the support plate 141B, when a shoulder of the sintering mold a1' formed on the outer side surface thereof comes into engagement with the edge of the opening 274B of the stop member 273B so that the upward displacement of the sintering mold is stopped. Then, the drive motor 256 is operated to lift up the lower plunger 255B to displace upward the lower press core fitted in the sintering mold, until the distance (or depth) of the top surface of the lower press core from the top surface of the sintering mold becomes a desired distance (or desired depth), which corresponds to the thickness of the first layer of powder material to be filled into the sintering mold. The subsequent operations are the same as those of the second embodiment described above, and thus not described for avoiding redundancy. In this embodiment, the movable base plate can bear only a limited (five, in this embodiment) sintering molds, so that after the last of the five sintering molds has been loaded with powder materials), the movable base plate 224B is moved to the rightmost position as viewed in FIG. 21 and the sintering molds in which the powder is loaded are taken out from the movable base plate. Then the movable table is returned back to the leftmost position as viewed in FIG. 21, where new sintering molds are placed thereon, and the next sequence of operations for loading powder material(s) into the new sintering molds is repeated.

In the above description, we have described exemplified sequences of operations carried out by the apparatus of several embodiments, which is specifically intended for loading powder material into a sintering mold which is used not only for forming a powder compact therein but also for retaining the powder compact therein during subsequent sintering process; however, the present invention may be also used for loading powder material into a powder-compact-forming mold which is used only for forming a powder compact therein while the powder compact thus formed is subjected to sintering process after removed from the mold. The disclosed methods and apparatus may be used for such powder material loading operations as well.

As clearly understood from the above, the following advantages may be provided by the present invention.

(1) A sequence of operations for loading powder material into a mold may be automated, so that loading of powder material into a mold may be carried out with high efficiency and at low cost.

(2) A powder compact in the form of multi-layers may be formed to have a highly uniform thickness even if the layer has a relatively wide surface area, unlike a powder layer formed by a manual powder material loading operation.

(3) A continuous fabrication process for obtaining sintered products may be realized by virtue of the automation of a sequence of operations for loading powder material into a mold.

(4) A multi-layered powder compact may be fabricated with precision and in an automated manner.

(5) High-quality sintered products may be obtained because of a highly uniform thickness of a layer of powder material filled in a sintering mold and subsequently pressed in the sintering mold.

Having described the present invention with reference to the preferred embodiments thereof, it is to be understood that the present invention is not limited to the disclosed embodiments, but may be embodied in various other forms without departing from the spirit and the scope of the present invention as defined by the appended claims.

What is claimed is:

1. An apparatus for automatically loading a desired amount of powder material into a hollow mold having a bore extending therethrough, said apparatus comprising:

a mold conveyor system for supporting and conveying said mold with a lower press core fitted in said bore, said mold conveyor system including a guide rail extending over a predetermined range, and a carrier movable along said guide rail and capable of supporting for vertical displacement said mold with said lower press core fitted in said bore;

at least one powder filling mechanism for filling an amount of powder material into said mold, said at least one powder filling mechanism being located at a powder filling position defined along a transportation path of said mold conveyed by said mold conveyor system, said at least one powder filling mechanism including a support plate having a top surface and a hole sized to receive said upper end of said mold, a hopper movably disposed on said support plate and adapted to store an amount of powder material therein, and a strickle mechanism for strickling off any excessive amount of powder material, being filled into said mold from said hopper, to the level of a top surface of said mold, wherein said upper end of said mold may be fitted in said hole without any substantial clearance therebetween and with said top surface of said support plate and a top surface of said mold being substantially flush with each other; and a press unit for pressing at a desired pressure the amount of powder material in said mold to form a powder compact, said press unit being disposed at a position different from the position at which said powder filling mechanism is disposed, wherein the mold in which the desired amount of powder compact is loaded is conveyed out of the powder filling position and a new mold with no powder material being loaded is conveyed to the powder filling position.

2. An apparatus for automatically loading a desired amount of powder material into a mold according to claim 1, wherein said press unit includes a lower plunger for pressing upward said lower press core fitted in said mold, and an upper plunger for pressing downward the amount of powder material in said mold.

3. An apparatus for automatically loading a desired amount of powder material into a mold according to claim 1, wherein said hopper is movable along a straight path between first and third positions at which said bottom opening of said hopper is closed by said support plate, wherein said hopper passes by a second position during a stroke between said first and third positions, at which said bottom opening of said hopper is in alignment with said hole in said support plate, whereby powder filling is completed by a single stroke of said hopper from one of said first and third positions to the other.

4. An apparatus for automatically loading a desired amount of powder material into a mold according to claim 1, wherein said hopper is movable between a first position at which said bottom opening of said hopper is closed by said support plate and a second position at which said bottom opening of said hopper is in alignment with said hole in said support plate, whereby powder filling is completed by a pair of strokes of said hopper from said first position to said second position and then back to said first position.

5. An apparatus for automatically loading a desired amount of powder material into a mold according to claim 1, wherein said at least one powder filling mechanism comprises a plurality of powder filling mechanisms, in which different powder materials are stored, respectively, differing from one another in at least one of properties including components of powder material, percentages of components, particle size and particle shape, wherein said plurality of powder filling mechanisms are arranged in line along said transportation path of said carrier.

6. An apparatus for automatically loading a desired amount of powder material into a mold according to claim 3, wherein said at least one powder filling mechanism comprises a plurality of powder filling mechanisms, in which different powder materials are stored, respectively, differing from one another in at least one of properties including component(s) of powder material, percentages of components, particle size and particle shape, wherein said plurality of powder filling mechanisms are arranged in line along said transportation path of said carrier.

7. An apparatus for automatically loading a desired amount of powder material into a mold according to claim 1, wherein said hopper forms a part of said strickle mechanism.

8. An apparatus for automatically loading a desired amount of powder material into a mold according to claim 1, wherein said carrier includes:

a movable base;

a receiving plate for supporting said mold, said receiving plate being supported by said movable base for vertical displacement relative to said movable base;

a push-up member for displacing said lower press core fitted in said bore of said mold when said mold is supported by said receiving plate, said push-up member being supported by said receiving plate for vertical displacement relative to said receiving plate; and a drive unit for driving said push-up member to make displacement.

9. An apparatus for automatically loading a desired amount of powder material into a mold according to claim 5, wherein said carrier includes:

a movable base;

a receiving plate for supporting said mold, said receiving plate being supported by said movable base for vertical displacement relative to said movable base;

a push-up member for displacing said lower press core fitted in said bore of said mold when said mold is supported by said receiving plate, said push-up member being supported by said receiving plate for vertical displacement relative to said receiving plate; and a drive unit for driving said push-up member to make displacement.

10. An apparatus for automatically loading a desired amount of powder material into a mold according to claim 1, further comprising:

a measure unit for measuring the weight of said mold with the amount of powder material filled into said mold, so as to measure the weight of the amount of powder material filled into said mold, said measure unit being disposed at a measuring position which is different from said powder filling position, said measure unit including support bars for supporting said mold placed on said carrier, and a load sensor for measuring the weight of the amount of powder.

11. An apparatus for automatically loading a desired amount of powder material into a hollow mold having a bore extending therethrough, said apparatus comprising:

a mold conveyor system for supporting and conveying said mold with a lower press core fitted in said bore;

a rotary table capable of indexing movement;

a powder filling mechanism for filling an amount of powder material into said mold, said powder filling mechanism being mounted on said rotary table, said powder filling mechanism including a least one support plate having a top surface and a hole sized to receive said upper end of said mold, at least one hopper movably disposed on said support plate and adapted to store an amount of powder material therein, and a strickle mechanism for strickling off any excessive amount of powder material, being filled into said mold from said hopper, to the level of a top surface of said mold, wherein said upper end of said mold may be fitted in said hole when said mold is in a powder filling position without any substantial clearance therebetween and with said top surface of said support plate and a top surface of said mold being substantially flush with each other; and a press unit for pressing at a desired pressure the amount of powder material in said mold to form a powder compact, said press unit being disposed at said powder filing position, wherein the mold in which the desired amount of powder compact is loaded is conveyed out of said powder filling position and a new mold with no powder material being loaded is conveyed to the powder filling position.

12. An apparatus for automatically loading a desired amount of powder material into a mold according to claim 11, further comprising a lift/support unit disposed at said powder filling position and including a lift bed for raising said mold to a level at which the upper end of said mold is received in said hole and said top surface of said support plate and a top surface of said mold being substantially flush with each other and a lower plunger which displaces said lower press core relative to said mold, wherein said press unit includes an upper press member for pressing downward the amount of powder material in said mold.

13. An apparatus for automatically loading a desired amount of powder material into a mold according to claim 11, wherein said mold conveyor system includes a guide rail, a movable base guided by said guide rail for movement along said guide rail and having a number of holes formed therein and arranged in line, each of said holes being adapted to be aligned with said bore of said mold, a stop member attached to said movable base, for limiting upward displacement of said mold, and a drive unit for driving said movable base to move along said guide rail in both directions, whereby said movable base is capable of carrying the same number of molds as that of said holes at one time.

14. An apparatus for automatically loading a desired amount of powder material into a mold according to claim 11, wherein a plurality of hoppers are disposed on said rotary table at circumferentially spaced positions with respect to the axis of said rotary table, said at least one hopper comprises a plurality of hoppers being capable of individual movement, and wherein different powder materials are stored in said plurality of hoppers, respectively, differing from one another in at least one of properties including component of powder material, percentages of components, particle size and particle shape.

15. An apparatus for automatically loading a desired amount of powder material into a mold according to claim 11, wherein said at least one hopper is movable between a first position at which said bottom opening of said at least one hopper is closed by said support plate and a second position at which said bottom opening of said at least one hopper is in alignment with said hole in said support plate, whereby powder filling is completed by a pair of strokes of said at least one hopper from said first position to said second position and then back to said first position.

16. An apparatus for automatically loading a desired amount of powder material into a mold according to claim 11, wherein said at least one hopper forms a part of said strickle mechanism.

17. A powder filling mechanism for filling powder material into a mold which has a bore opening at a top end thereof, said mechanism comprising:

a support plate having a top surface and a hole sized to receive said upper end of said mold, wherein said upper end of said mold may be fitted in said hole without any substantial clearance therebetween and with said top surface of said support plate and a top surface of said mold being substantially flush with each other;

a hopper having a bottom surface and so disposed as to be movable on said top surface of said support plate with said bottom surface being in contact with said top surface of said support plate, said hopper having an amount of powder material stored therein; and said hopper having a bottom opening for dispensing powder material, which opens at said bottom surface and has a size equal to or greater than that of a top opening of said bore of said mold, wherein said hopper is movable on said top surface of said support plate and across said top surface of said mold.

18. A powder filling mechanism according to claim 17, wherein:

said hopper is movable between a first position at which said bottom opening of said hopper is closed by said support plate and a second position at which said bottom opening of said hopper is in alignment with said hole in said support plate, whereby powder filling is completed by a pair of strokes of said hopper from said first position to said second position and then back to said first position.

19. A powder filling mechanism, for filling powder material into a mold which has a bore opening at a top end thereof, said mechanism comprising:

a support plate having a top surface and a hole sized to receive said upper end of said mold, wherein said upper end of said mold may be fitted in said hole without any substantial clearance therebetween and with said top surface of said support plate and a top surface of said mold being substantially flush with each other;

a hopper having a bottom surface and so disposed as to be movable on said top surface of said support plate with said bottom surface being in contact with said top surface of said support plate, said hopper having an amount of powder material stored therein; and said hopper having a bottom opening for dispensing powder material, which opens at said bottom surface and has a size equal to or greater than that of a top opening of said bore of said mold, wherein said hopper is movable on said top surface of said support plate and across said top surface of said mold, wherein said hopper is movable along a straight path between first and third positions at which said bottom opening of said hopper is closed by said support plate, wherein said hopper passes by a second position during a stroke between said first and third positions, at which said bottom opening of said hopper is in alignment with said hole in said support plate, whereby powder filling is completed by a single stroke of said hopper from one of said first and third positions to the other.

* * * * *